US010545987B2

(12) United States Patent
Borowiec et al.

(10) Patent No.: US 10,545,987 B2
(45) Date of Patent: Jan. 28, 2020

(54) REPLICATION TO THE CLOUD

(71) Applicant: PURE Storage, Inc., Mountain View, CA (US)

(72) Inventors: Benjamin Borowiec, Santa Clara, CA (US); Ethan L. Miller, Santa Cruz, CA (US); Steve Hodgson, Mountain View, CA (US); Andrew R. Bernat, Mountain View, CA (US); Ganesh Ramanarayanan, Menlo Park, CA (US); Malcolm Sharpe, Mountain View, CA (US); Alan S. Driscoll, Fremont, CA (US)

(73) Assignee: Pure Storage, Inc., Mountain View, CA (US)

( * ) Notice: Subject to any disclaimer, the term of this patent is extended or adjusted under 35 U.S.C. 154(b) by 894 days.

(21) Appl. No.: 14/577,110

(22) Filed: Dec. 19, 2014

(65) Prior Publication Data

US 2016/0196320 A1   Jul. 7, 2016

(51) Int. Cl.
*G06F 16/27*       (2019.01)
*G06F 16/174*      (2019.01)

(52) U.S. Cl.
CPC .......... *G06F 16/27* (2019.01); *G06F 16/1744* (2019.01); *G06F 16/1748* (2019.01)

(58) Field of Classification Search
CPC ....................................... G06F 16/30
USPC ........................................... 707/624
See application file for complete search history.

(56) References Cited

U.S. PATENT DOCUMENTS

| 5,208,813 | A  | 5/1993 | Stallmo |
| 5,403,639 | A  | 4/1995 | Belsan |
| 5,940,838 | A  | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |
| 6,757,769 | B1 | 6/2004 | Ofer |

(Continued)

FOREIGN PATENT DOCUMENTS

| CN | 103370685 A | 10/2013 |
| CN | 103370686 A | 10/2013 |

(Continued)

OTHER PUBLICATIONS

The International Search Report and the Written Opinion received from the International Searching Authority (ISA) for International Application No. PCT/US2015/066613, dated Apr. 5, 2016, 11 pages.

(Continued)

*Primary Examiner* — Irete F Ehichioya
*Assistant Examiner* — Johnese T Johnson

(57) ABSTRACT

Systems, methods, and computer readable storage mediums for replicating data to the cloud. A first dataset is replicated from a first storage subsystem to the cloud, with only the changes made to the first dataset since a previous replication event being replicated to the cloud. Additionally, the data may be deduplicated and compressed before being replicated from the first storage subsystem to the cloud. In some cases, the first dataset may be replicated to the cloud in a stream format which is not directly usable and then, at a later point in time, loaded onto a second storage subsystem from the cloud.

14 Claims, 21 Drawing Sheets

(56) References Cited

U.S. PATENT DOCUMENTS

| | | |
|---|---|---|
| 6,799,283 B1 | 9/2004 | Masaaki et al. |
| 6,834,298 B1 | 12/2004 | Singer et al. |
| 6,850,938 B1 | 2/2005 | Sadjadi |
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,205,065 B2 | 6/2012 | Matze |
| 8,332,678 B1 | 12/2012 | Mahalingam et al. |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2006/0271604 A1* | 11/2006 | Shoens ............ G06F 17/30088 |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2010/0332401 A1* | 12/2010 | Prahlad ............... G06F 17/302 705/80 |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

| Original System ID | Original Medium ID | Local Medium ID |
|---|---|---|
| 1240 | 150 | 5 |
| 1240 | 180 | 12 |
| 1240 | 225 | 18 |
| ⋮ | ⋮ | ⋮ |
| 1230 | 637 | 25 |
| ⋮ | ⋮ | ⋮ |

Table 1300

*FIG. 13*

| Original System ID | Original Medium ID | Local Medium ID | |
|---|---|---|---|
| 1445 | 1425 | 36 | Table 1465 |
| ⋮ | ⋮ | ⋮ | |

| Medium ID | Range | Unmasked State | Offset | Underlying | |
|---|---|---|---|---|---|
| 36 | 0 to (A-1) | Unmasked | 0 | 36 | Table 1470 |
| ⋮ | ⋮ | ⋮ | ⋮ | ⋮ | |

| Medium ID | Range | Unmasked State | Offset | Underlying | |
|---|---|---|---|---|---|
| 1410 | 0 to (A-1) | Unmasked | 0 | 1410 | Table 1400 |
| 1410 | A to (B-1) | Unmasked | 0 | 1410 | |
| 1410 | B to (C-1) | Masked | -B | 645 | |
| 1410 | C to (D-1) | Masked | 0 | 650 | |
| 1410 | D to (E-1) | Unmasked | 0 | 1410 | |
| ⋮ | ⋮ | ⋮ | ⋮ | ⋮ | |
| 1410 | M to (N-1) | Unmasked | 0 | 1410 | |

List 1415A

| Medium ID | Range |
|---|---|
| 1425 | 0 to (A-1) |
| ⋮ | ⋮ |

Duplicate Extents Table 1430

| Medium ID | Range | Duplicate Range |
|---|---|---|
| 1410 | C to (D-1) | B to (C-1) |
| 1410 | M to (N-1) | D to (E-1) |
| ⋮ | ⋮ | ⋮ |

Medium Mapping Table 1455

| Medium ID | Range | Unmasked State | Offset | Underlying |
|---|---|---|---|---|
| 1425 | 0 to (A-1) | Masked | 0 | 1410 |
| 650 | C to (D-1) | Masked | -C | 645 |
| ⋮ | ⋮ | ⋮ | ⋮ | ⋮ |

Physical to Logical Address Mappings Table 1460A

| Physical Address | Sector |
|---|---|
| - | - |

FIG. 14

Table 1500

| Medium ID | Range | Reference or Data? | Reference to Medium ID: Range |
|---|---|---|---|
| 1410 | 0 to (A-1) | Reference | 1410: 0 to (A-1) |
| 1410 | A to (B-1) | Data | - |
| 1410 | B to (C-1) | Data | - |
| 1410 | C to (D-1) | Reference | 1410: B to (C-1) |
| 1410 | D to (E-1) | Data | - |
| ⋮ | ⋮ | ⋮ | ⋮ |
| 1410 | M to (N-1) | Reference | 1410: D to (E-1) |

List 1415B

| Medium ID | Range |
|---|---|
| 1425 | 0 to (A-1) |
| ⋮ | ⋮ |
| 1410 | A to (B-1) |

List 1415C

| Medium ID | Range |
|---|---|
| 1425 | 0 to (A-1) |
| ⋮ | ⋮ |
| 1410 | A to (B-1) |
| 1410 | B to (C-1) |
| 1410 | D to (E-1) |

Physical to Logical Address Mappings Table 1460B

| Physical Address | Sector |
|---|---|
| 1462X | <1410, 1> |
| 1463X | <1410, 2> |
| 1464X | <1410, 4> |

FIG. 15

REPLICATION TO THE CLOUD

BACKGROUND

Technical Field

Embodiments described herein relate to storage systems, and more particularly, to techniques for replicating data in a storage system.

Description of the Related Art

Business continuity and remote data protection are of paramount concern for enterprises. Unfortunately, most data protection and disaster recovery (DR) solutions require complex planning and significant investment to achieve the desired recovery point objective (RPO). More importantly, even if desired low RPO is achieved, the recovery times are much higher without making significant investments in DR solutions. Also, many DR solutions require DR site infrastructure to be identical to the production site, making the DR configurations restrictive. As a result of complexity, inflexibility, and economics, DR solutions are applied to only select few mission-critical applications or forgone completely.

SUMMARY

Various embodiments of systems and methods for replicating data in a storage system are contemplated.

In one embodiment, a storage system may include a plurality of storage subsystems, with each storage subsystem including a storage controller and one or more storage devices. A first storage subsystem may replicate a dataset to a second storage subsystem and/or to the cloud. The dataset may include any type of data, such as one or more volumes, virtual machines, files, protection groups, disk images, and/or other collections of data.

In one embodiment, the first storage subsystem may be configured to perform replication without copying previously replicated data. For example, the first storage subsystem may be configured to take a first snapshot of a dataset and replicate the first snapshot to the second storage subsystem. At a later point in time, the first storage subsystem may take a second snapshot of the dataset, wherein the second snapshot includes only the changes made to the dataset since the first snapshot was taken. The first storage system may deduplicate and compress the second snapshot, and then the first storage subsystem may replicate the deduplicated and compressed second snapshot to the second storage subsystem. In some embodiments, rather than replicating data to the second storage subsystem, the first storage subsystem may replicate data to the cloud. When replicating to the cloud, the data reduction savings achieved due to deduplication and compression may be preserved between the first storage subsystem and the cloud.

In one embodiment, a third storage subsystem may be configured to replicate a dataset to the cloud in a stream format which is not directly usable for serving client data requests. The stream format may include a plurality of tuples, wherein some of the tuples reference other tuples and/or previously sent data. The cloud may be configured to store the dataset without processing the stream of tuples. Rather, at a later point in time, the cloud may copy the dataset to a fourth storage subsystem, and the fourth storage subsystem may process the dataset to recreate the dataset in a format which is usable by one or more applications.

These and other embodiments will become apparent upon consideration of the following description and accompanying drawings.

BRIEF DESCRIPTION OF THE DRAWINGS

FIG. 13 illustrates one embodiment of a table for mapping original system ID to local medium ID.

FIG. 14 illustrates one embodiment of a set of tables utilized during a replication process.

FIG. 15 illustrates another embodiment of a set of tables utilized during a replication process.

Figure 1:
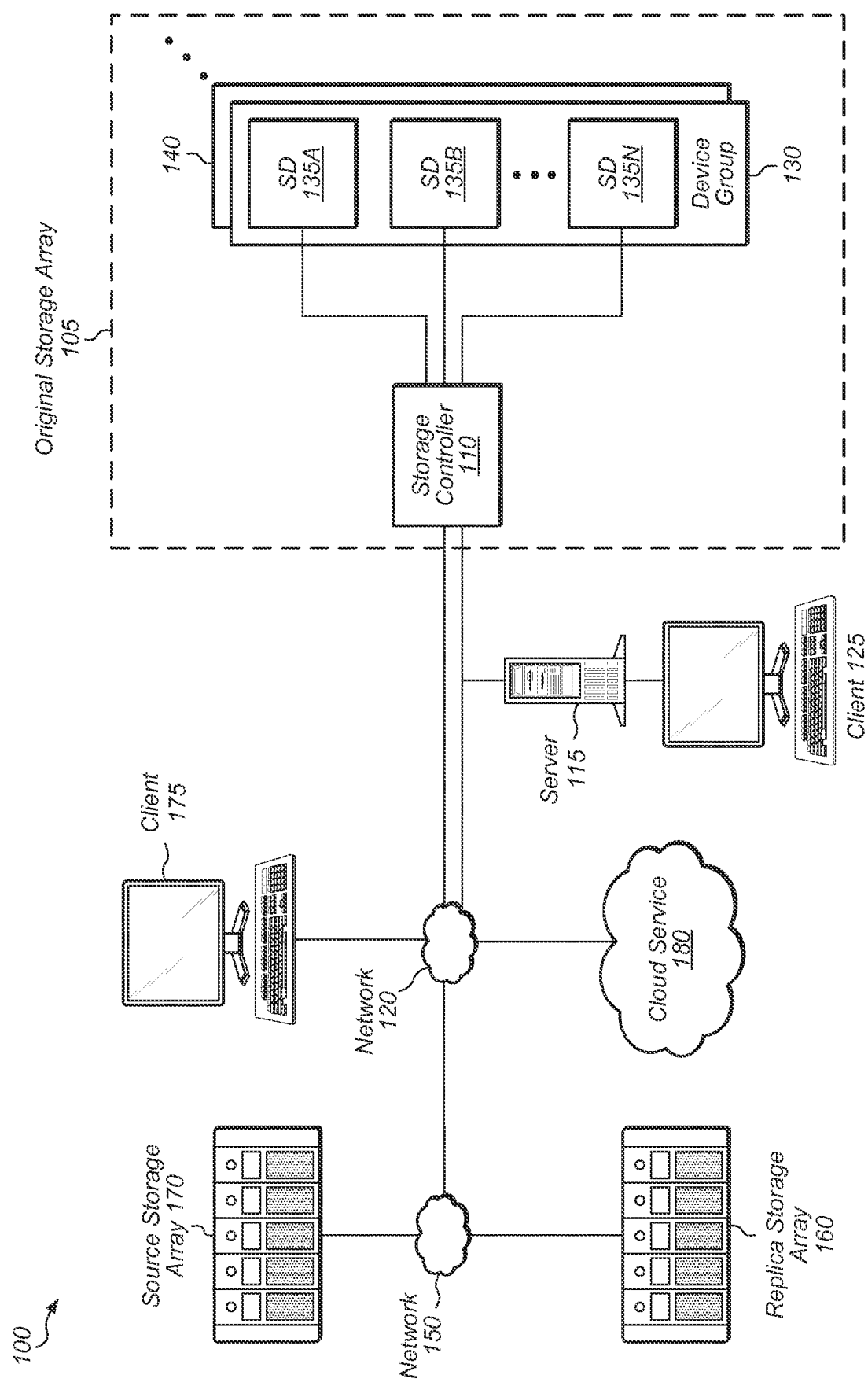
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage subsystem . . . ." Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include original storage array 105, replica storage array 160, and source storage array 170. These storage arrays are representative of any number of storage arrays which may exist within a storage system. Original storage array 105 may include storage controller 110 and storage device groups 130 and 140, which are representative of any number of storage device groups. Although not shown in FIG. 1, replica storage array 160 and source storage array 170 may also include one or more storage controllers and one or more storage device groups. It is noted that storage arrays 105, 160, and 170 may also be referred to as storage subsystems.

Storage system 100 also includes networks 120 and 150, cloud service 180, server 115, and clients 125 and 175. Server 115 is representative of any number and type (e.g., file server, application server, block server, database server) of servers which may be coupled to original storage array 105. Server 115 may be configured to enable storage and retrieval of data from original storage array 105 by client 125 and one or more other clients (not shown). Additionally, any number and type of virtual servers may be hosted by server 115, depending on the embodiment.

As shown, storage device group 130 includes storage devices 135A-N, which are representative of any number and type of storage devices (e.g., solid-state drives (SSDs)). Storage controller 110 may be coupled to client computer system 125 via server 115, and storage controller 110 may be coupled remotely over network 120 to client computer system 175. Clients 125 and 175 are representative of any number of clients which may utilize storage controller 110 for storing and accessing data in system 100. It is noted that some systems may include only a single client, connected directly or remotely to storage controller 110. It is also noted that original storage array 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for storing data across devices 135A-N to prevent loss of data due to the failure of a device or the failure of storage locations within a device. Storage controller 110 may also utilize any of various deduplication and compression techniques for reducing the amount of data stored in devices 135A-N.

In various embodiments, cloud service 180 may include program instructions which when executed by a processor are configured to perform a variety of tasks related to the replication of data within storage system 100. Cloud service 180 may be configured to execute on a server, computer, or other computing device to perform the functions described herein. In some embodiments, cloud service 180 may include hardware and/or control logic configured to perform the functions and tasks described herein. For example, cloud service 180 may be implemented using any combination of dedicated hardware (e.g., application specific integrated circuit (ASIC)), configurable hardware (e.g., field programmable gate array (FPGA)), and/or software (e.g., program instructions) executing on one or more processors. It is noted that cloud service 180 may also be referred to as cloud-based service 180 or cloud assist service 180.

In one embodiment, cloud service 180 may execute within a cloud computing platform provided by a web services provider (e.g., Amazon). The cloud computing platform may provide large amounts of computing assets and storage availability to cloud service 180. In another embodiment, cloud service 180 may execute on a separate system or network external to the local network of original storage array 105, wherein cloud service 180 may be described as executing on or residing in a private cloud.

In various embodiments, multiple mapping tables may be maintained by storage controller 110 and/or cloud service 180. These mapping tables may include an address translation table, a deduplication table, an overlay table, and/or other tables. The address translation table may include a plurality of entries, with each entry holding a virtual-to-physical mapping for a corresponding data component. This mapping table may be used to map logical read/write requests from each of the client computer systems 125 and 175 to physical locations in storage devices 135A-N. A "physical" pointer value may be read from the mappings associated with a given dataset or snapshot during a lookup operation corresponding to a received read/write request. This physical pointer value may then be used to locate a storage location within the storage devices 135A-N. It is noted that the physical pointer value may not be direct. Rather, the pointer may point to another pointer, which in turn points to another pointer, and so on. For example, a pointer may be used to access another mapping table within a given storage device of the storage devices 135A-N that identifies another pointer. Consequently, one or more levels of indirection may exist between the physical pointer value and a target storage location.

In various embodiments, the address translation table may be accessed using a key comprising a volume, snapshot, or other dataset ID, a logical or virtual address, a sector number, and so forth. A received read/write storage access request may identify a particular volume, sector, and length. A sector may be a logical block of data stored in a volume or snapshot, with a sector being the smallest size of an atomic I/O request to the storage system. In one embodiment, a sector may have a fixed size (e.g., 512 bytes) and the mapping tables may deal with ranges of sectors. For example, the address translation table may map a volume or snapshot in sector-size units. The areas being mapped may be managed as ranges of sectors, with each range consisting of one or more consecutive sectors. In one embodiment, a range may be identified by <snapshot, start sector, length>, and this tuple may be recorded in the address translation table and one or more other tables. In one embodiment, the key value for accessing the address translation table may be the combination of the volume or snapshot ID and the received sector number. A key is an entity in a mapping table that distinguishes one row of data from another row. In other embodiments, other types of address translation tables may be utilized.

In one embodiment, the address translation table may map volumes or snapshots and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a volume ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 125 and 175 are representative of any number of stationary or mobile computers such as desktop personal computers (PCs), physical computer terminals executing thin-client software, servers, server farms, workstations, laptops, handheld computers, servers, personal digital assistants (PDAs), smart phones, and so forth. Generally speaking, client computer systems 125 and 175 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of storage arrays, cloud services, client computers, storage controllers, networks, storage device groups, and data storage devices is not limited to those shown in FIG. 1.

At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
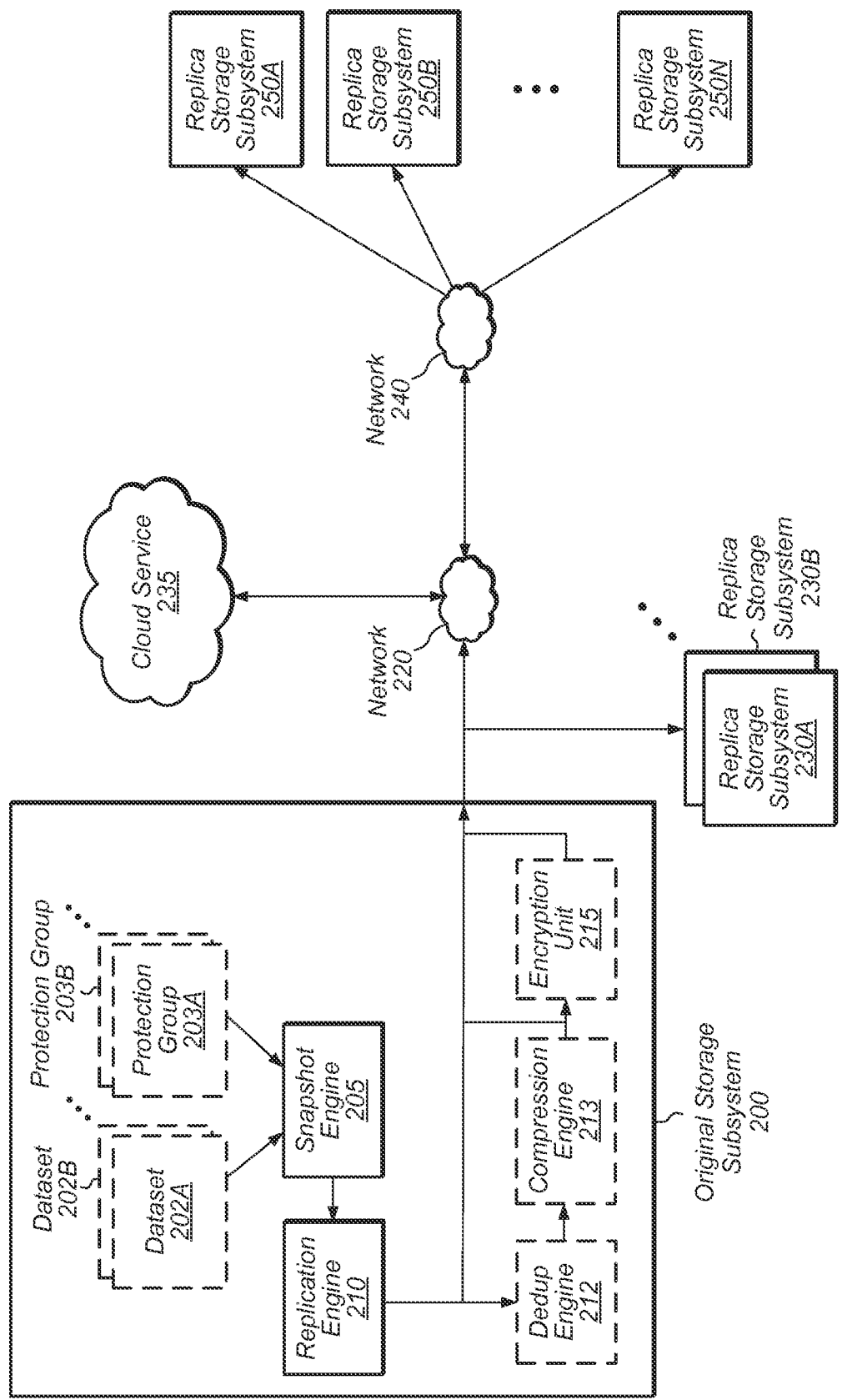
FIG. 2 is a block diagram illustrating one embodiment of a storage environment.

Turning now to FIG. 2, a block diagram illustrating one embodiment of a storage environment is shown. Original storage subsystem 200 includes at least snapshot engine 205, replication engine 210, deduplication (or dedup) engine 212, compression engine 213, and encryption unit 215. Snapshot engine 205, replication engine 210, deduplication engine 212, compression engine 213, and encryption unit 215 may be implemented using any combination of software and/or hardware. Snapshot engine 205 may be configured to take snapshots of dataset 202A-B and protection group 203A-B, which are representative of any number of datasets and protection groups stored on original storage subsystem 200. A snapshot may be defined as the state of a logical collection of data (e.g., volume, database) at a given point in time. In some cases, a snapshot may include only the changes that have been made to the logical collection of data since a previous snapshot was taken.

Replication engine 210 may be configured to choose data for replication from among dataset 202A-B and protection group 203A-B. Original storage subsystem 200 may replicate a dataset or protection group to any of a plurality of storage subsystems and/or cloud service 235. A protection group may be defined as a group of hosts, host groups, and volumes within a storage subsystem or storage system. A single protection group may consist of multiple hosts, host groups and volumes. Generally speaking, a protection group may include logical storage elements that are replicated together consistently in order to correctly describe a dataset.

Replica storage subsystems 230A-B are coupled to original storage subsystem 200 and may be the target of replication operations. In one embodiment, replica storage subsystems 230A-B may be at the same location and on the same network as original storage subsystem 200. Original storage subsystem 200 may also be coupled to cloud service 235 via network 220, and original storage subsystem 200 may utilize cloud service 235 as a target for replicating data. Original storage subsystem 200 may also be coupled to replica storage subsystems 250A-N via network 240, and replica storage subsystems 250A-N may be the target of replication operations.

Replication engine 210 may be configured to selectively utilize deduplication (or dedup) unit 212 and/or compression unit 213 to deduplicate and compress the data being replicated. In one embodiment, replication engine 210 may utilize deduplication unit 212 and compression unit 213 to deduplicate and compress a dataset or protection group selected for replication. Any suitable types of deduplication and compression may be utilized, depending on the embodiment. In other embodiments, replication engine 210 may bypass deduplication unit 212 and compression unit 213 when performing replication. Replication engine 210 may also be configured to selectively utilize encryption unit 215 for encrypting data being replicated to other subsystems and/or to cloud service 235. Any suitable type of encryption may be utilized, depending on the embodiment.

In one embodiment, replication engine 210 may be configured to replicate data to replica storage subsystems 230A-B without encrypting the data being replicated. Additionally, in various embodiments, data replicated to the cloud may or may not be encrypted. In this embodiment, replication engine 210 may be configured to encrypt data being replicating using encryption unit 215 for replication events which target cloud service 235. Replication engine 210 may encrypt or not encrypt data being replicated to replica storage subsystems 250A-N, depending on the embodiment. In one embodiment, an administrator or other authorized user may be able to select when encryption is enabled depending on the type of data being replicated and/or the replication target. A user may specify that encryption should be enabled for certain replication targets regardless of the type of data being replicated.

In one embodiment, original storage subsystem 200 may be configured to encrypt user data while storing one or more of the medium graph (e.g., graph 900 of FIG. 9), medium mapping table 1000, table 1300, other mapping tables, and/or other metadata in an unencrypted form. Original storage subsystem 200 may share and/or send one or more of these unencrypted graphs, tables, and/or other metadata to cloud service 235. This would enable cloud service 235 to perform medium garbage collection. This would also enable cloud service 235 to utilize the medium graph, tables, and other metadata for performing dynamic replication target selection. In some embodiments, original storage subsystem 200 may be configured to keep the secret for encrypting and decrypting data stored locally on original storage subsystem 200. If the storage device storing the secret on original storage subsystem 200 is reset to an erased state with empty blocks (even if original storage subsystem 200 is offline), then the secret for decrypting data in the cloud would be lost. This would allow for instant remote data wiping.

In another embodiment, original storage subsystem 200 may be configured to store unencrypted user data. In this embodiment, original storage subsystem 200 may offload deduplication to cloud service 235. Cloud service 235 may be configured to perform computationally expensive deduplication and then send the deduplicated data back to original storage subsystem 200. In some embodiments, cloud service 235 may be configured to deduplicate data across multiple different storage subsystems which would allow for higher levels of data reduction to be obtained.

Original storage subsystem 200 may be configured to generate and display a graphical user interface (GUI) to allow users to manage the replication environment. When a user logs into the GUI, the GUI may show which subsystems can be used as targets for replication. In one embodiment, the GUI may be populated with data stored locally on subsystem 200. In another embodiment, the GUI may be populated with data received from cloud service 235. For example, original storage subsystem 200 may be part of a first organization, and when subsystem 200 is new and first becomes operational, subsystem 200 may not include data regarding the other subsystems that exist within the first organization. Subsystem 200 may query cloud service 235 and cloud service 235 may provide data on all of the subsystems of the first organization which are available for serving as replication targets. These subsystems may then appear in the GUI used for managing the replication environment.

In one embodiment, snapshots that are replicated from original storage subsystem 200 to a target subsystem may have the same global content ID but may have separate local IDs on original storage subsystem 200 and the target subsystem. In other embodiments, global IDs may be used across multiple storage subsystems. These global IDs may be generated such that no duplicate IDs are generated. For example, in one embodiment, an ID of the device on which it (e.g., the snapshot, medium, or corresponding data) was first written may be prepended. In other embodiments, ranges of IDs may be allocated/assigned for use by different devices. These and other embodiments are possible and are contemplated. For example, the local ID of a first snapshot on original storage subsystem 200 may map to the global content ID 290 and the local ID of the first snapshot on the target subsystem may also map to the global content ID 290. In this way, a given storage subsystem may be able to identify which of its snapshots are also present on other storage subsystems. In one embodiment, cloud service 235 may maintain mappings of local content IDs to global content IDs for the storage subsystems of a given organization.

Figure 3:
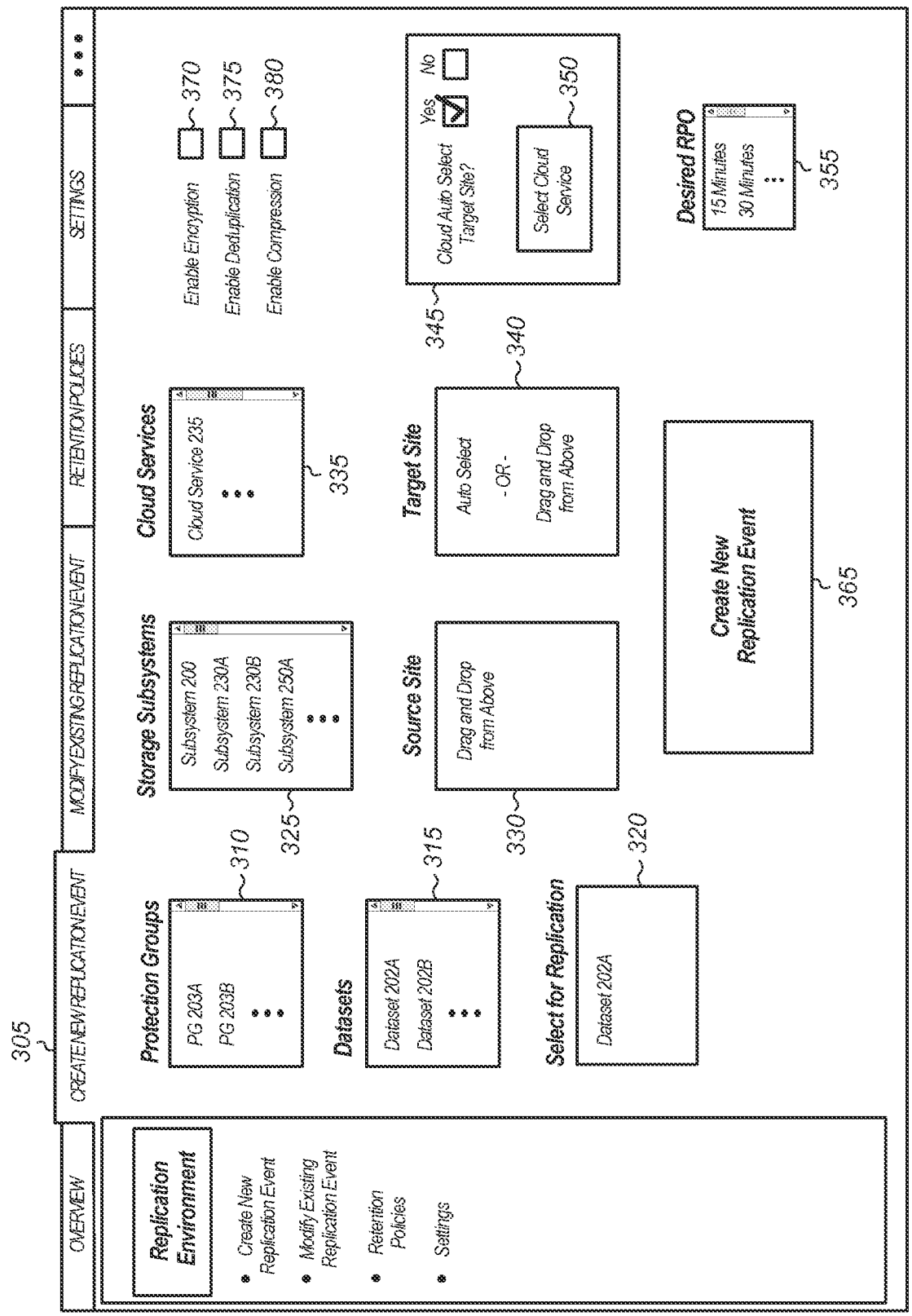
FIG. 3 is a graphical user interface (GUI) for managing a replication environment.

Referring now to FIG. 3, one embodiment of a graphical user interface (GUI) for managing a replication environment is shown. Depending on the embodiment, the GUI may be generated by software executing on a storage subsystem, a computing device coupled to the storage subsystem, or by a cloud service. In one embodiment, the GUI may be populated from data stored by the cloud service and from data stored on one or more storage subsystems. This data may include the available storage subsystems and available cloud services which may be utilized for replication events.

The replication GUI may have multiple tabs as shown in FIG. 3. For example, the "create new replication event" tab 305 is selected in the view shown in FIG. 3. The user may also be able to select other tabs as well, including an overview tab, modify existing replication event tab, retention policies tab, settings tab, and one or more other tabs. By selecting these tabs, the user may change the view of the GUI.

The user may select from among protection groups box 310 or datasets box 315 for data to replicate. Other embodiments may include other types of data to select for replication. The user may drag any of these items to replication box 320 to specify which data to replicate. Additionally, the user may select a storage subsystem from storage subsystems box 325 to add to source site box 330, and the user may select a storage subsystem from storage subsystems box 325 to add to target site box 340. Alternatively, the user may select a cloud service from cloud services box 335 to add to target site box 340. In some embodiments, multiple different cloud services corresponding to multiple different cloud infrastructures may be available as the replication target site. Target site box 340 may be used to identify which storage subsystem or cloud service should be used as the target for replication for replicating the data selected in box 320. In some embodiments, more than one storage subsystem or cloud service may be added to target site box 340, and then the chosen data may be replicated to more than one target.

In one embodiment, the available storage subsystems shown in box 325 may be populated with data provided by a cloud service. The cloud service may be able to populate box 325 by identifying all of the available storage subsystems for the given organization from log data generated and phoned home from the storage subsystems to the cloud service. Alternatively, an administrator or other authorized user may manually add the available storage subsystems and cloud services to boxes 325 and 335, respectively.

The user may select the "yes" option in box 345 to allow the cloud service to automatically select the target site for the replication event being created. The cloud service may select the target site based on characteristics (e.g., utilized storage capacity, health) of the potential target storage subsystems. If the user selects the "yes" option, then the user may specify which cloud service should perform the automatic selection of the replica and recovery targets. In one embodiment, the user may drag a cloud service from box 335 to box 350 to perform the selection. If the user selects the "no" option in box 345, then the user may manually select the target site in box 340.

If a cloud service is performing the automatic selection of the replica and recovery targets, then there are multiple types of auto select policies which may be utilized. In some embodiments, the cloud service may auto select replication policies based on the current state of the system. In other embodiments, the cloud service may optimize the policy dynamically over time. If the original storage system is replicating to on-premise storage subsystems and a cloud service, new mediums may be sent to a different replication host without syncing from a stable medium. This would allow the new storage subsystem to bypass the initial replication seed while recovering the missing medium extents from the cloud service. When a snapshot is restored, the cloud service may create a stable medium and sync the stable medium to the replica storage subsystem. Alternatively, the data could be requested as needed. The replica storage subsystem could function as a cache for the cloud service.

In one embodiment, encryption may be automatically enabled or disabled depending on the specified target. For example, in one embodiment, if a cloud service is selected as the target site, then encryption may be automatically enabled for the replication event. In other embodiments, the user may select to enable or disable encryption via box 370. Additionally, the user may select to enable or disable deduplication and compression via boxes 375 and 380, respectively. Alternatively, deduplication and/or compression may be automatically enabled or disabled depending on the specified target and/or specified data being replicated.

In one embodiment, the user may also select the desired recovery point objective (RPO) for the replication event in box 355. The setting selected in box 355 may determine how often the replication event is performed. When the user has made all of the selections for the replication event, the user may select the "create new replication event" box 365 to actually create the new replication event. It is noted that there may be one or more other settings not shown in the GUI of FIG. 3 which are configurable by the user to control the new replication event. For example, the user may set a retention policy which may be utilized to determine how long to retain the replicated data. It is noted that in other embodiments, the appearance of the replication environment GUI may differ from that shown in FIG. 3. Accordingly, some of the information shown in FIG. 3 may be omitted or may appear differently. Also, additional information and replication-related settings may be included in the GUI in other embodiments.

Figure 4:
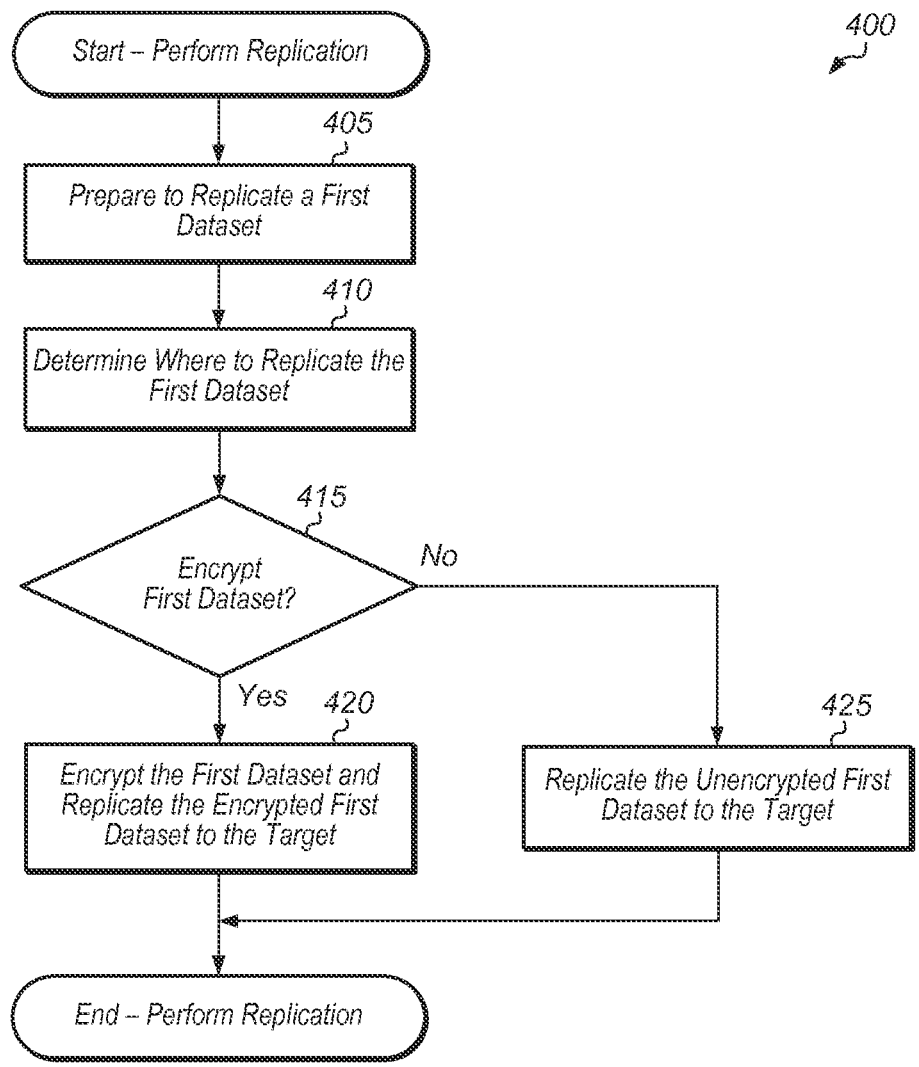
FIG. 4 is a generalized flow diagram illustrating one embodiment of a method for performing replication.

Referring now to FIG. 4, one embodiment of a method 400 for performing replication is shown. The components embodied in system 100 described above (e.g., storage controller 110) may generally operate in accordance with method 400. In addition, the steps in this embodiment are shown in sequential order. However, some steps may occur in a different order than shown, some steps may be performed concurrently, some steps may be combined with other steps, and some steps may be absent in another embodiment.

A first storage subsystem may prepare to replicate a first dataset (block 405). In one embodiment, the first storage subsystem may be a storage array. The first dataset may include one or more volumes, virtual machines, disk images, files, protection groups, and/or one or more other data objects. Next, the first storage subsystem may determine where to replicate the first dataset (block 410). In one embodiment, a second storage subsystem may have already been selected as the replication target of the first dataset. In another embodiment, a cloud service may have already been selected as the replication target of the first dataset. In a further embodiment, multiple storage subsystems may have been selected as replication targets of the first dataset.

After determining where to replicate the first dataset, the first storage subsystem may determine whether the first dataset should be encrypted prior to being replicated to the target (conditional block 415). In one embodiment, the first storage subsystem may determine whether to encrypt the first dataset based on the identity or location of the target. If the first storage subsystem determines to encrypt the first dataset (conditional block 415, "yes" leg), then the first storage subsystem may encrypt the first dataset and replicate the encrypted first dataset to the target (block 420). If the first storage subsystem determines not to encrypt the first dataset (conditional block 415, "no" leg), then the first storage subsystem may replicate the unencrypted first dataset to the target (block 425). For example, if the target is a second storage subsystem of the same organization, then the first storage subsystem may determine not to encrypt the first dataset. However, if the target is a cloud service or a storage subsystem on a potentially compromised network, then the first storage subsystem may encrypt the first dataset. After blocks 420 and 425, method 400 may end.

Figure 5:
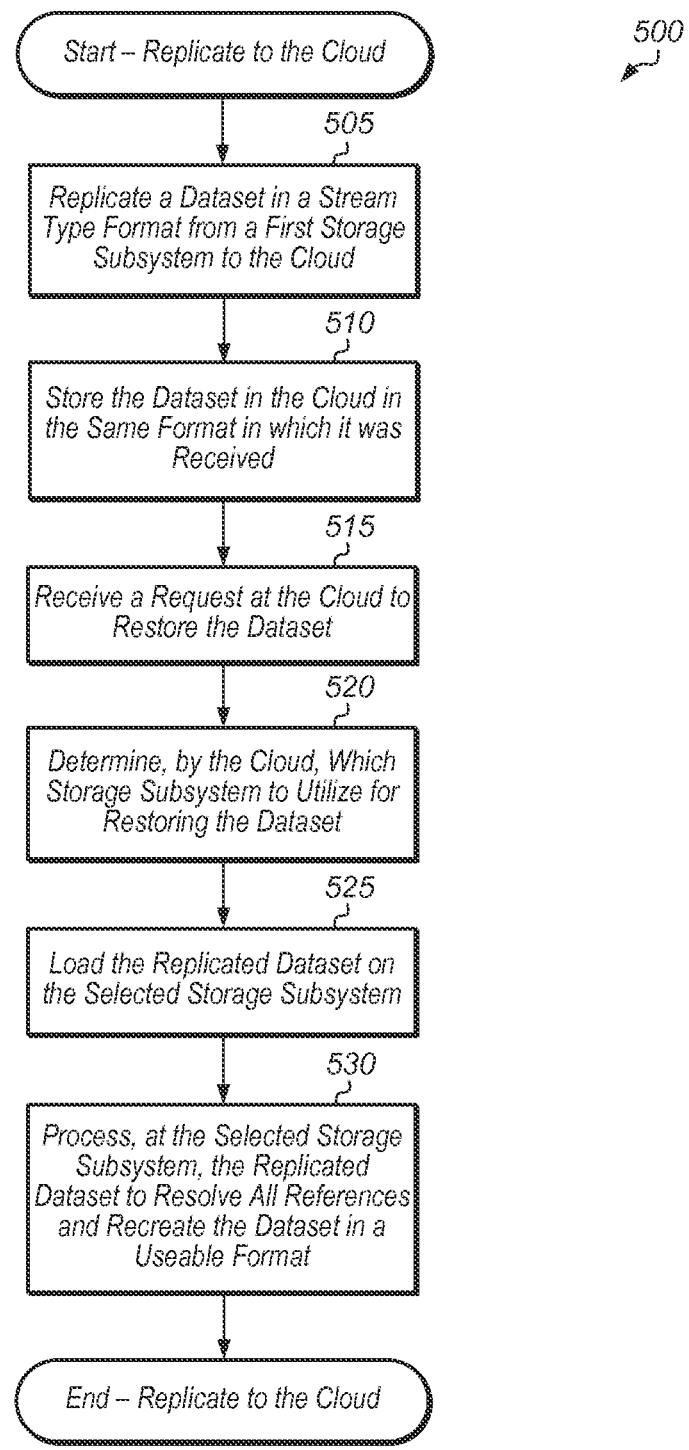
FIG. 5 is a generalized flow diagram illustrating one embodiment of a method for replicating to the cloud.

Referring now to FIG. 5, one embodiment of a method 500 for replicating to the cloud is shown. The components embodied in system 100 described above (e.g., storage controller 110, cloud service 180) may generally operate in accordance with method 500. In addition, the steps in this embodiment are shown in sequential order. However, some steps may occur in a different order than shown, some steps may be performed concurrently, some steps may be combined with other steps, and some steps may be absent in another embodiment.

A dataset may be replicated in a stream type format from a first storage subsystem to the cloud (block 505). The stream type format may not be directly usable by the cloud. In one embodiment, the dataset may be replicated as a plurality of tuples, wherein each tuple includes a key and one or more data fields including data such as a pointer used to identify or locate data components. Some tuples may refer to previous tuples within the replicated dataset, while other tuples may refer to data already stored in the cloud or on another storage subsystem. The cloud may not perform any processing of the replicated dataset to resolve these references, but instead may simply store the replicated dataset in the same format in which it was received (block 510).

Next, the cloud may receive a request to restore the dataset (block 515). In one embodiment, the request may be generated in response to detecting a failure or malfunction of the first storage subsystem. In response to receiving the request, the cloud may determine which storage subsystem to utilize for restoring the dataset (block 520). The cloud may be coupled to a plurality of storage subsystems, and the cloud may select a given storage subsystem based on information received from the plurality of storage subsystems (e.g., an analysis of log data, or otherwise), based on monitoring the plurality of storage subsystems (e.g., accessing and examining stored logs, current conditions, events, etc.). Alternatively, in some embodiments, the request may specify the storage subsystem to be used for restoring the dataset. Next, the cloud may cause data corresponding to the replicated dataset to be conveyed to the selected storage subsystem (block 525) for restoration. In various embodiments, the data may be conveyed from a cloud based source. In other embodiments, at least some portion of the data may be conveyed from one or more other storage subsystems. In such an embodiment, the other storage subsystems may first convey the data to the cloud responsive to a request. In other embodiments, the other storage subsystems may be directed to convey such data to the selected storage subsystem without being first conveyed to the cloud. Still other embodiments may include the cloud receiving and storing one or more logs of transactions on the storage subsystems. In such embodiments, the log(s) may be used to recreate and/or update data in the cloud or on one or more of the storage subsystems. Various combinations of such approaches are possible and are contemplated. Then, the selected storage subsystem may process the replicated dataset to resolve all references and recreate the dataset in a useable format (block 530). After block 530, method 500 may end.

Figure 6:
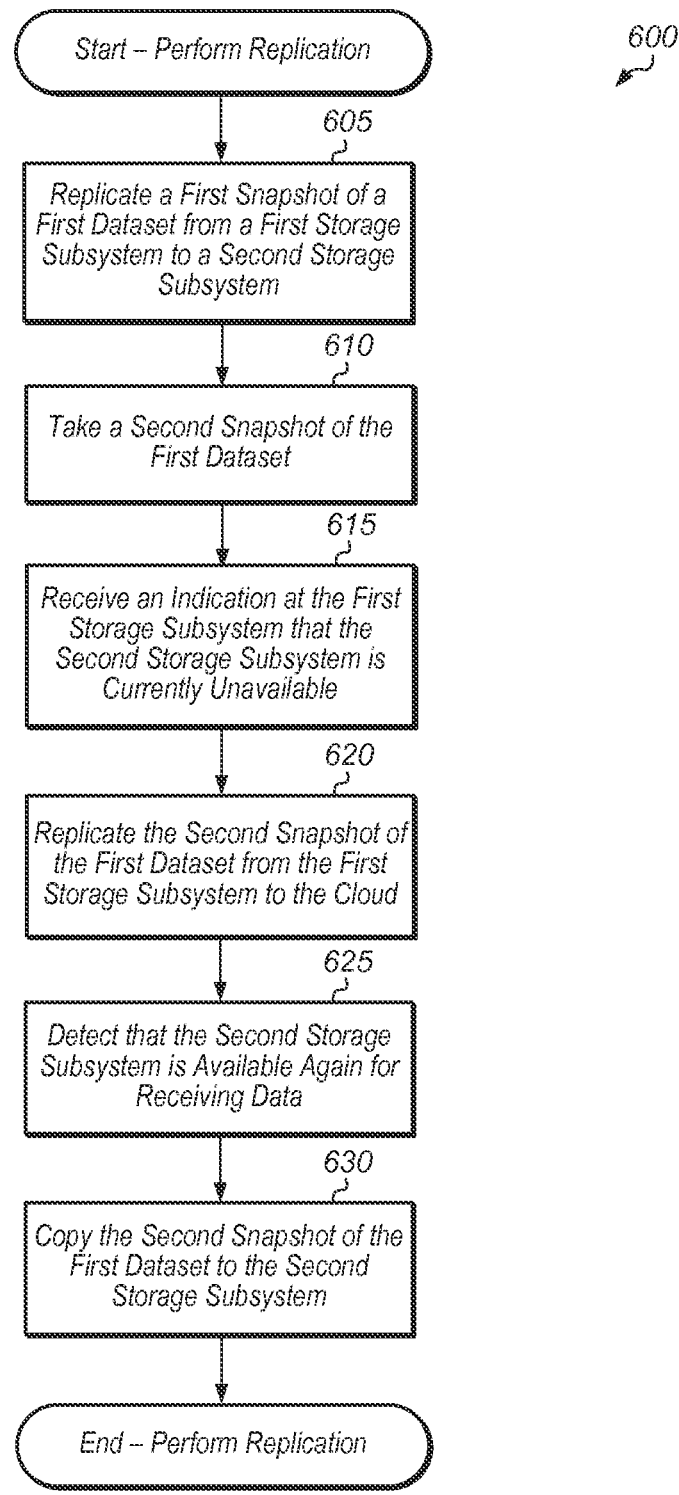
FIG. 6 is a generalized flow diagram illustrating one embodiment of a method for performing replication.

Referring now to FIG. 6, one embodiment of a method 600 for performing replication is shown. The components embodied in system 100 described above (e.g., storage controller 110, cloud service 180) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

A first snapshot of a first dataset may be replicated from a first storage subsystem to a second storage subsystem (block 605). The first dataset may include a collection of data, such as one or more of a volume, group of files, protection group, virtual machine, or other data. In one embodiment, the first and second storage subsystems may be storage arrays. In other embodiments, the first and second storage subsystems may be other types of storage systems.

At a later point in time, a second snapshot of the first dataset may be taken (block 610). The second snapshot may only include the changes made to the first dataset since the first snapshot was taken. In some embodiments, snapshots may be taken of the first dataset on a regularly scheduled basis. Next, the first storage subsystem may receive an indication that the second storage subsystem is currently unavailable (block 615). In response to receiving this indication, the first storage subsystem may replicate the second snapshot of the first dataset to the cloud (block 620). In various embodiments, the entire snapshot may be replicated to the cloud. In other embodiments, only the blocks that have changed since the first snapshot may be replicated to the cloud. In further embodiments, a log of transactions may be sent to the cloud. Any approach may be utilized, or any combination of the these.

At a later point in time, the cloud may detect that the second storage subsystem is available again for receiving data (block 625). Alternatively, the cloud may receive an indication that the second storage subsystem is available for receiving data. Next, the cloud may copy the second snapshot of the first dataset to the second storage subsystem (block 630). After block 630, method 600 may end. It is noted that method 600 may be repeated for each snapshot that is taken of a dataset which is scheduled for replication.

Figure 7:
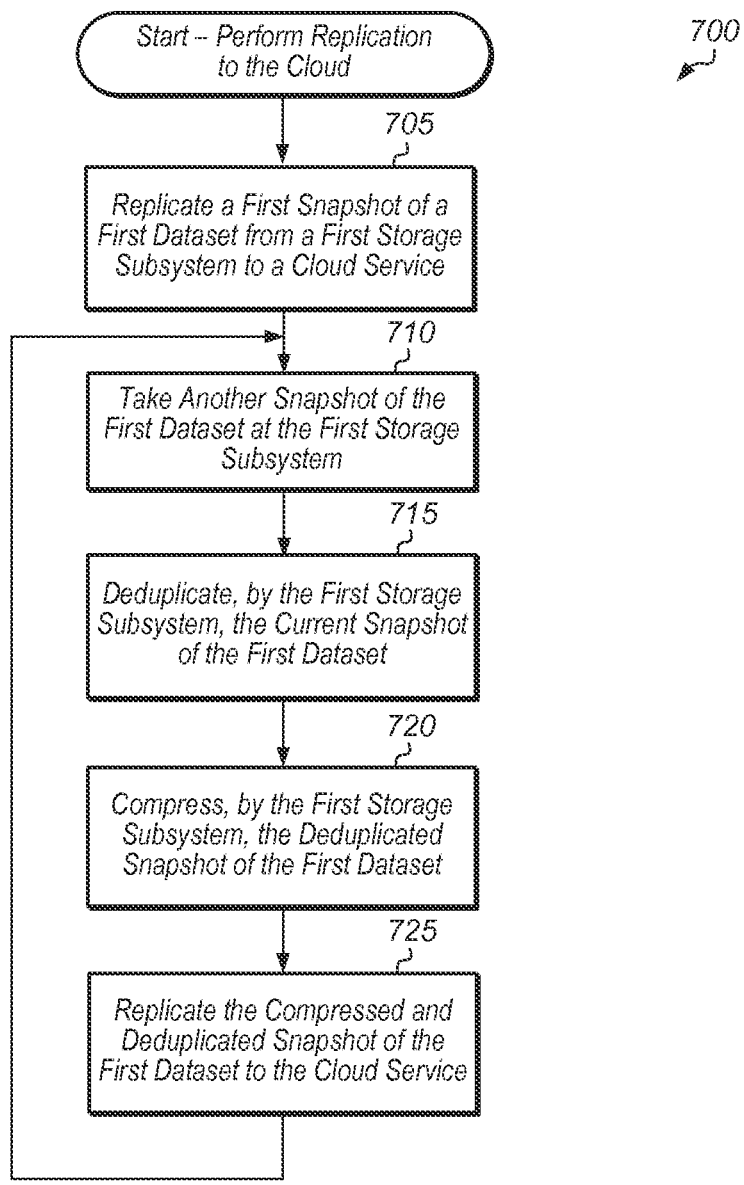
FIG. 7 is a generalized flow diagram illustrating one embodiment of a method for performing replication to the cloud.

Referring now to FIG. 7, one embodiment of a method 700 for performing replication to the cloud is shown. The components embodied in system 100 described above (e.g., storage controller 110, cloud service 180) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A first snapshot of a first dataset may be replicated from a first storage subsystem to a cloud service (block 705). At a later point in time, another snapshot of the first dataset may be taken by the first storage subsystem (block 710). The current snapshot may only include the changes made to the first dataset since the most recent (or previous) snapshot was taken. Next, the first storage subsystem may deduplicate the current snapshot of the first dataset (block 715). The deduplicated snapshot may include references to data included in the previous snapshot and any other snapshots which have already been replicated from the first storage subsystem to the cloud service, including snapshots of other volumes. Then, the first storage subsystem may compress the deduplicated snapshot of the first dataset (block 720). Any suitable form of compression may be utilized, depending on the embodiment. Next, the first storage subsystem may replicate the compressed and deduplicated snapshot of the first dataset to the cloud service (block 725). Since the current snapshot includes changes from the previous snapshot, and then the snapshot is deduplicated and compressed before being replicated, the amount of data which is sent from the first storage subsystem to the cloud may generally be reduced. In some embodiments, only changes from a previous snapshot are included. However, in other embodiments other data may be included as well. This approach achieves a reduction in both the amount of network traffic and the amount of time required to replicate the snapshot. After block 725, method 700 may return to block 710 to take another snapshot of the first dataset.

Figure 8:
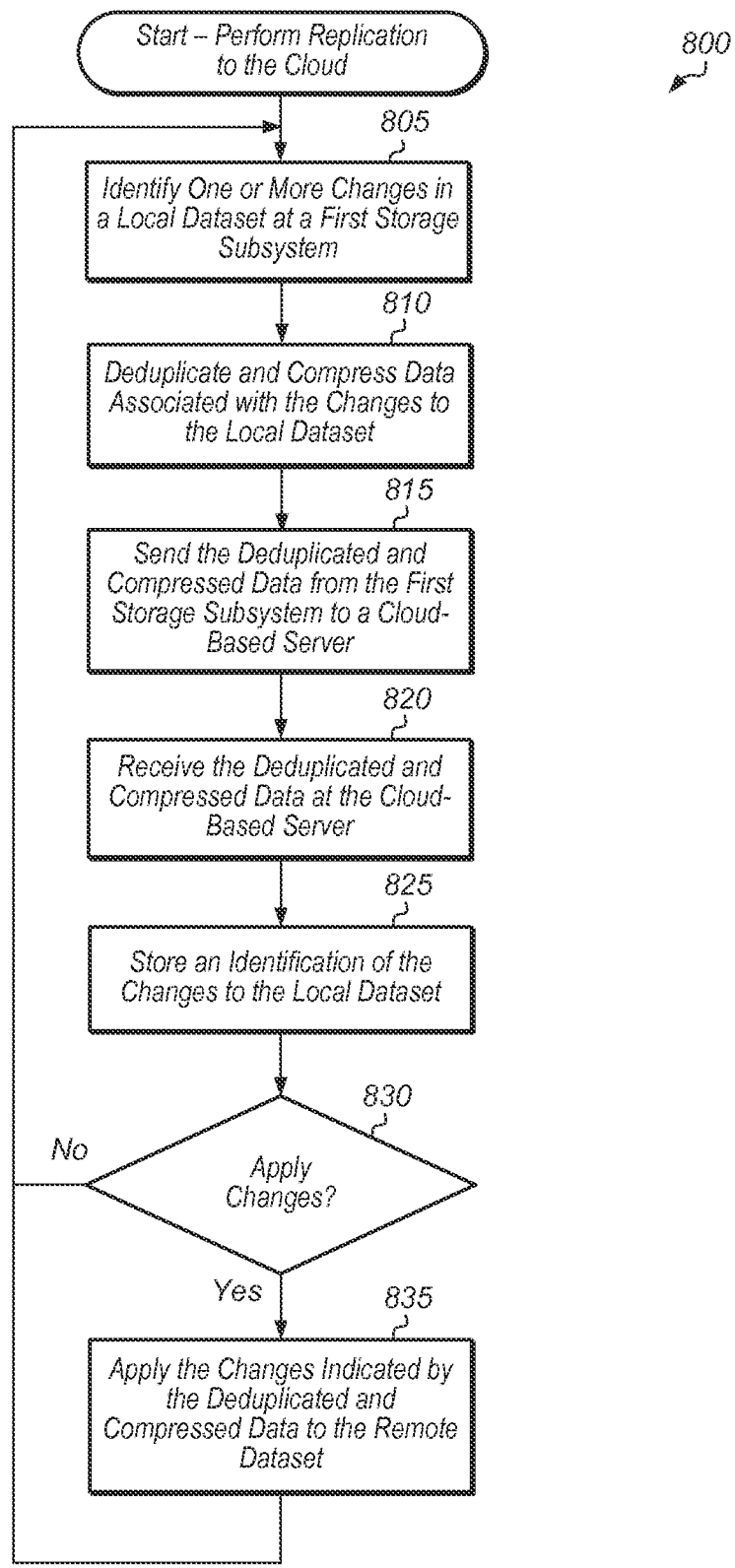
FIG. 8 is a generalized flow diagram illustrating one embodiment of a method for performing replication to the cloud.

Turning now to FIG. 8, one embodiment of a method 800 for performing replication to the cloud is shown. The components embodied in system 100 described above (e.g., storage controller 110, cloud service 180) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A first storage subsystem may identify one or more changes in a local dataset (block 805). The local dataset may be any of the various types of previously described datasets. In one embodiment, the first storage subsystem may identify one or more changes in the local dataset by taking a snapshot of the local dataset, wherein the snapshot includes only changes made to the local dataset since a previous snapshot was taken.

Next, the first storage subsystem may deduplicate and compress data associated with the changes to the local dataset (block 810). In one embodiment, the data associated with the changes may be the snapshot. In another embodiment, the data associated with the changes may be one or more transactions which were applied to the local dataset. In other embodiments, other data may be generated which is associated with the changes to the local dataset. Then, the first storage subsystem may send the deduplicated and compressed data to a cloud-based server (block 815). The cloud-based server may include or be coupled to a remote dataset which is a replicated version of the local dataset. In some embodiments, the first storage subsystem may also send one or more medium identifiers (IDs) to the cloud-based server, wherein the medium IDs are associated with the snapshot of the local dataset. Mediums and medium IDs are described in more detail below in the discussion regarding FIGS. 9-21.

The cloud-based server may receive the deduplicated and compressed data sent by the first storage subsystem (block 820). Next, the cloud-based server may store an identification of the changes to the local dataset (block 825). In one embodiment, the cloud-based server may store a log of transactions that have been applied to the local dataset. Then, the cloud-based server may determine whether to apply the changes indicated by the deduplicated and compressed data to the remote dataset (conditional block 830). If the cloud-based server determines to apply the changes (conditional block 830, "yes" leg), then the cloud-based server may apply the changes indicated by the deduplicated and compressed data to the remote dataset (block 835). If the cloud-based server determines not to apply the changes (conditional block 830, "no" leg), then method 800 may return to block 805 with the first storage subsystem identifying additional change(s) to the local dataset. For example, in various embodiments multiple changes may be identified before making the changes. In other embodiment, identified changes may be made one at a time. In some embodiment, determining whether to make currently identified changes before identifying further changes may be based on current system condition, network conditions, time of day, or any other condition. In one embodiment, the cloud-based server may periodically consume transactions, while in other embodiments, the cloud-based server may wait until the number of transactions has reached a given threshold before applying the transactions to the remote dataset. In a further embodiment, the cloud-based server may apply the changes responsive to detecting a failure of the first storage subsystem. After block 835, method 800 may return to block 805 with the first storage subsystem identifying additional change(s) to the local dataset.

Figure 9:
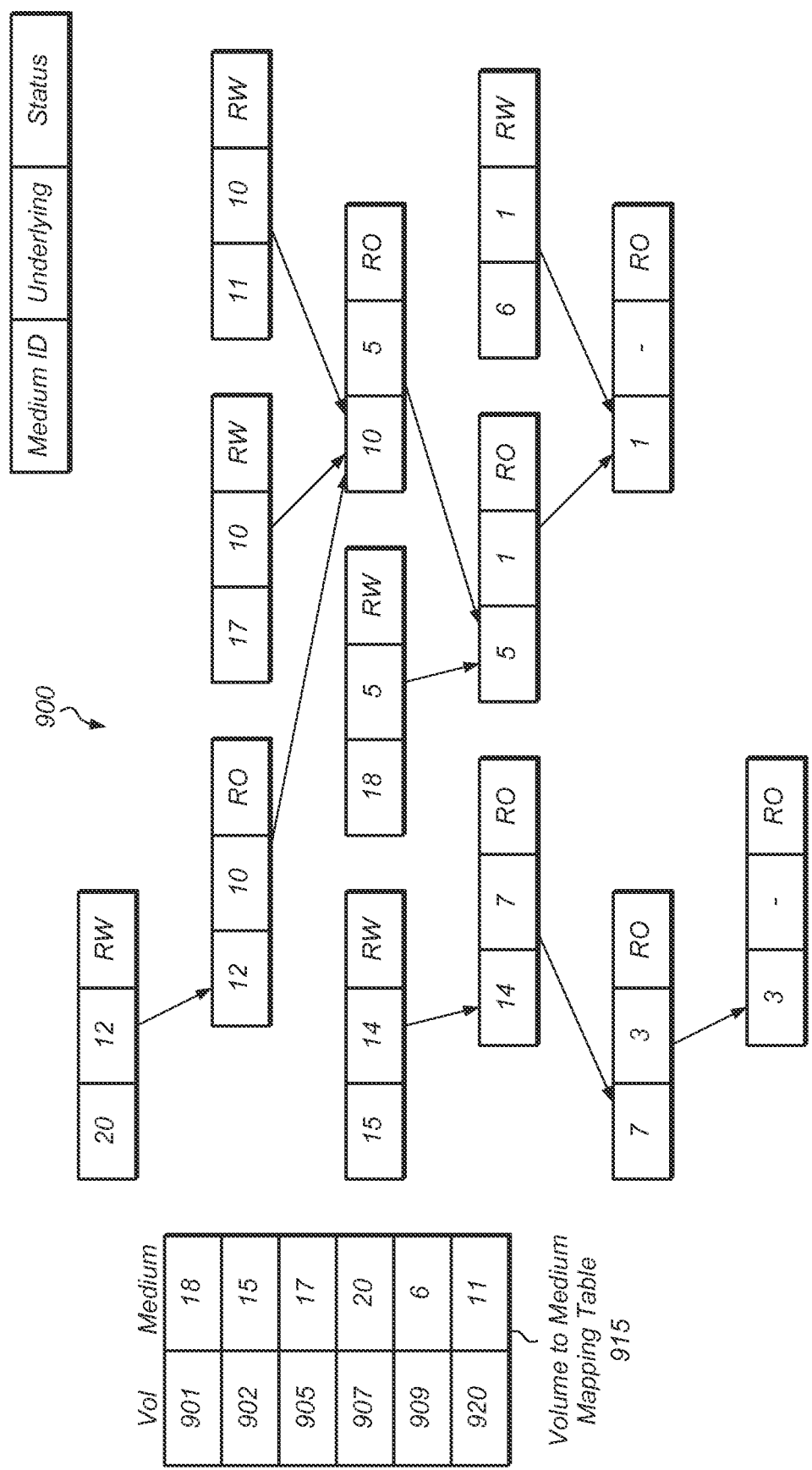
FIG. 9 is a generalized block diagram of one embodiment of a directed acyclic graph (DAG) of mediums.

Referring now to FIG. 9, a block diagram illustrating a directed acyclic graph (DAG) 900 of mediums is shown. Also shown is a volume to medium mapping table 915 that shows which medium a volume maps to for each volume in use by a storage system. Volumes 901, 902, 905, 907, 909, and 920 may be considered pointers into graph 900.

The term "medium" as is used herein is defined as a logical grouping of data. A medium may have a corresponding identifier (ID) with which to identify the logical grouping of data. Each medium may have a unique ID that is never reused in the system or subsystem. In other words, the medium ID is non-repeating. In one embodiment, the medium ID may be a monotonically increasing number. In some embodiments, the medium ID may be incremented for each snapshot taken of the corresponding dataset, volume, or logical grouping of data. In these embodiments, the medium ID may be a sequential, non-repeating ID. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 915 is only one example of a volume to medium mapping table. Other volume to medium mapping tables may have other numbers of entries for other numbers of volumes.

Each medium is depicted in graph 900 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. Within graph 900, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

It is noted that the term "ancestor" may be used to refer to underlying mediums of a given medium. In other words, an ancestor refers to a medium which is pointed to by a first medium or which is pointed to by another ancestor of the first medium. For example, as described above and shown in FIG. 9, medium 20 points to medium 12, medium 12 points to medium 10, medium 10 points to medium 5, and medium 5 points to medium 1. Therefore, mediums 12, 10, 5, and 1 are ancestors of medium 20. Similarly, mediums 10, 5, and 1 are ancestors of medium 12.

The set of mediums on the bottom left of graph 900 is an example of a linear set. As depicted in graph 900, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 900, medium 14 is stable with writes to volume 102 going to medium 15.

Volume to medium mapping table 915 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 900.

Figure 10:
FIG. 10 illustrates one embodiment of a medium mapping table.

Turning now to FIG. 10, one embodiment of a medium mapping table 1000 is shown. Any portion of or the entirety of medium mapping table 1000 may be stored in storage controller 110 (of FIG. 1) and/or in one or more of storage devices 135A-N (of FIG. 1). A volume identifier (ID) may be used to access volume to medium mapping table 915 to determine a medium ID corresponding to the volume ID. This medium ID may then be used to access medium mapping table 1000. It is noted that table 1000 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 10. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 1000. A range attribute may also be included in each entry of table 1000, and the range may be in terms of data blocks. The size of a block of data (e.g., 4 KB, 8 KB) may vary depending on the embodiment. It is noted that the terms "range" and "extent" may be used interchangeably herein. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 1000 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33, while blocks 500-899 of medium ID 35 map to blocks 100-499 of medium ID 5. It is noted that in other embodiments, mediums may be broken up into more than three ranges.

The state column of table 1000 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 1000. In the registered state, a lookup is performed recursively. The unmasked state determines whether a lookup should be performed in the basis medium, or whether the lookup should only be performed in the underlying medium. Although not shown in table 1000 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 1000 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 1000, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 11:
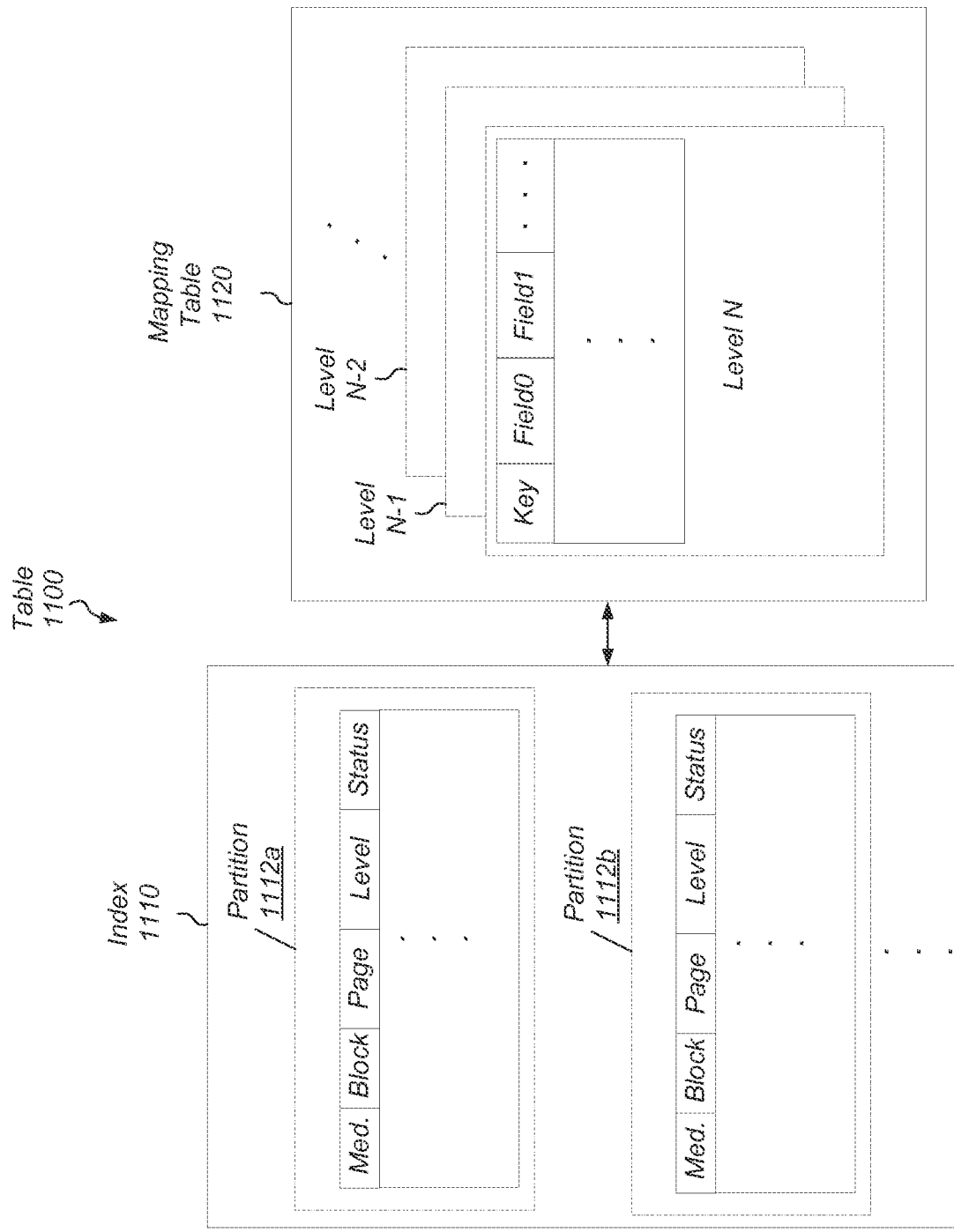
FIG. 11 illustrates one embodiment of a table utilized by a storage controller.

Turning now to FIG. 11, a block diagram of one embodiment of a table 1100 is shown. In various embodiments, table 1100 may be an address translation table, a deduplication table, an overlay table, or any other type of table utilized by a storage controller. In an embodiment with table 1100 utilized as an address translation table, a given received read/write request received by a storage controller may identify a particular volume, sector (or block number), and length. The volume may be translated into a medium ID using the volume-to-medium mapping table. The medium ID and block number may then be used to access index 1110 to locate an index entry corresponding to the specific medium ID and block number. The index entry may store at least one tuple including a key. Each index entry may also include a level ID and page ID of a corresponding entry in mapping table 1120.

Using the level ID, page ID, and a key value generated from the medium ID and block number, the corresponding mapping table entry may be located and a pointer to the storage location may be returned from this entry. The pointer may be used to identify or locate data stored in the storage devices of the storage system. In addition to the pointer value, status information, such as a valid indicator, a data age, a data size, and so forth, may be stored in Field 0 to FieldN shown in Level N of mapping table 1120. It is noted that in various embodiments, the storage system may include storage devices (e.g., SSDs) which have internal mapping mechanisms. In such embodiments, the pointer in the mapping table entry may not be an actual physical address per se. Rather, the pointer may be a logical address which the storage device maps to a physical location within the device.

For the purposes of this discussion, the key value used to access entries in index 1110 is the medium ID and block number corresponding to the data request. However, in other embodiments, other types of key values may be utilized. In these embodiments, a key generator may generate a key from the medium ID, block number, and/or one or more other requester data inputs, and the key may be used to access index 1110 and locate a corresponding entry.

In one embodiment, index 1110 may be divided into partitions, such as partitions 1112*a*-1112*b*. In one embodiment, the size of the partitions may range from a 4 kilobyte (KB) page to 256 KB, though other sizes are possible and are contemplated. Each entry of index 1110 may store a key value, and the key value may be based on the medium ID, block number, and other values. For the purposes of this discussion, the key value in each entry is represented by the medium ID and block number. This is shown merely to aid in the discussion of mapping between mediums and entries in index 1110. In other embodiments, the key values of entries in index 1110 may vary in how they are generated.

In various embodiments, portions of index 1110 may be cached, or otherwise stored in a relatively fast access memory. In various embodiments, the entire index 1110 may be cached. In some embodiments, where the primary index has become too large to cache in its entirety, or is otherwise larger than desired, secondary, tertiary, or other index portions may be used in the cache to reduce its size. In addition to the above, in various embodiments mapping pages corresponding to recent hits may be cached for at least some period of time. In this manner, processes which exhibit accesses with temporal locality can be serviced more rapidly (i.e., recently accessed locations will have their mappings cached and readily available).

In some embodiments, index 1110 may be a secondary index which may be used to find a key value for accessing a primary index. The primary index may then be used for locating corresponding entries in address translation table 1100. It is to be understood that any number of levels of indexes may be utilized in various embodiments. In addition, any number of levels of redirection may be utilized for performing the address translation of received data requests, depending on the embodiment. In some embodiments, a corresponding index may be included in each level of mapping table 1120 for mappings which are part of the level. Such an index may include an identification of mapping table entries and where they are stored (e.g., an identification of the page) within the level. In other embodiments, the index associated with mapping table entries may be a distinct entity, or entities, which are not logically part of the levels themselves. It is noted that in other embodiments, other types of indexes and mapping tables may be utilized to map medium IDs and block numbers to physical storage locations.

Mapping table 1120 may comprise one or more levels. For example, in various embodiments, table 1120 may comprise 16 to 64 levels, although other numbers of levels supported within a mapping table are possible and contemplated. Three levels labeled Level "N", Level "N−1" and Level "N−2" are shown for ease of illustration. Each level within table 1120 may include one or more partitions. In one embodiment, each partition is a 4 kilo-byte (KB) page. In one embodiment, a corresponding index 1110 may be included in each level of mapping table 1120. In this embodiment, each level and each corresponding index 1110 may be physically stored in a random-access manner within the storage devices.

In another embodiment, table 1100 may be a deduplication table. A deduplication table may utilize a key comprising a hash value determined from a data component associated with a storage access request. For each data component, a deduplication application may be used to calculate a corresponding hash value. In order to know if a given data component corresponding to a received write request is already stored in one of the storage devices, bits of the calculated hash value (or a subset of bits of the hash value) for the given data component may be compared to bits in the hash values of data components stored in one or more of the storage devices.

In a further embodiment, table 1100 may be an overlay table. One or more overlay tables may be used to modify or elide tuples corresponding to key values in the underlying mapping table and provided by other tables in response to a query. The overlay table(s) may be used to apply filtering conditions for use in responding to accesses to the mapping table or during flattening operations when a new level is created. Keys for the overlay table need not match the keys for the underlying mapping table. For example, an overlay table may contain a single entry stating that a particular range of data has been deleted or is otherwise inaccessible and that a response to a query corresponding to a tuple that refers to that range is invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in responses to queries to the underlying mapping table. In some embodiments, a range of key values may be used to efficiently identify multiple values to which the same operation is applied. In this manner, tuples may effectively be "deleted" from the mapping table by creating an "elide" entry in the overlay table and without modifying the mapping table. The overlay table may be used to identify tuples that may be dropped from the mapping table in a relatively efficient manner. It is noted that in other embodiments, other types of mapping tables may be utilized with the replication techniques disclosed herein. For example, in another embodiment, a single log file may be utilized to map logical addresses to physical addresses. In a further embodiment, a key-value store may be utilized. Other structures of mapping tables are possible and are contemplated.

Figure 12:
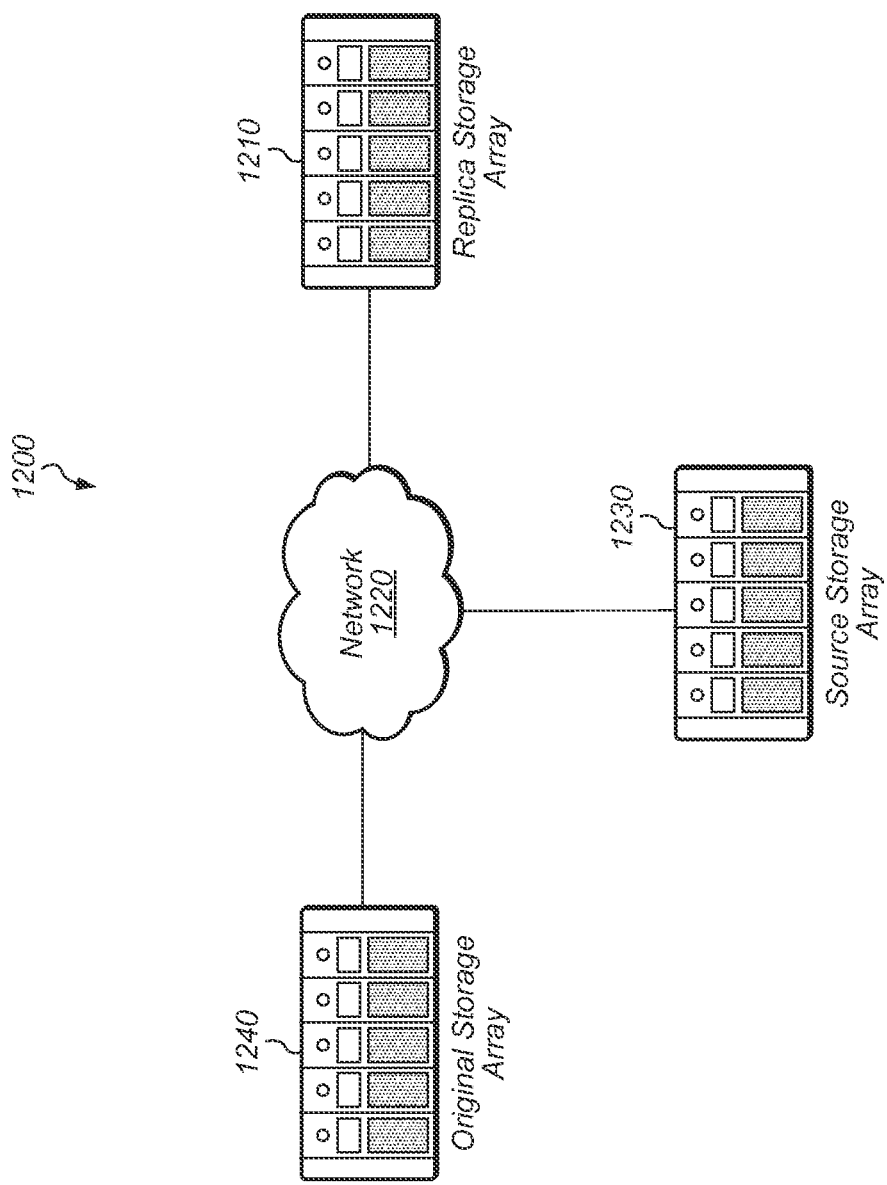
FIG. 12 is a generalized block diagram of one embodiment of a system with multiple storage arrays.

Turning now to FIG. 12, a block diagram of one embodiment of a system 1200 with multiple storage arrays is shown. System 1200 may include original storage array 1240, replica storage array 1210, and source storage array 1230. In one embodiment, these arrays may be coupled together via network 1220, which is representative of any number and type of networks. System 1200 may also include any number of other storage arrays in addition to those shown. It is noted that storage arrays 1210, 1230, and 1240 may also be referred to as storage systems.

In one embodiment, each of storage arrays 1210, 1230, and 1240 may include the components (e.g., storage controller, device groups) shown in storage array 105 (of FIG. 1). Additionally, each storage array may utilize volume to medium mapping tables similar to volume to medium mapping table 915 (of FIG. 9) and medium mapping tables similar to medium mapping table 1000 (of FIG. 10) to track the various volumes and mediums which are utilized by the storage array.

For the purposes of this discussion, original storage array 1240 represents the array on which a given volume and snapshot were first created. Replica storage array 1210 may represent the array to which the given snapshot is being replicated. Source storage array 1230 may represent an array containing the medium to be replicated from which replica storage array 1210 is pulling missing data necessary for the given snapshot. It is noted that these designations of the various storage arrays are used in the context of a given replication operation. For subsequent replication operations, these designations may change. For example, a first snapshot may be replicated from original storage array 1240 to replica storage array 1210 at a particular point in time. At a later point in time, a second snapshot may be replicated from replica storage array 1210 to original storage array 1240. For the replication of the second snapshot, storage array 1210 may be referred to as an "original" storage array while storage array 1240 may be referred to as a "replica" storage array. Also, the source storage system and the original storage system may be the same for a given replication event. In other words, system 1210 could pull data to replicate a medium from system 1240 directly if it chooses.

In system 1200, snapshots may be taken independently by original storage array 1240. Then, replica storage array 1210 may decide which particular snapshots to replicate when replica storage array 1210 connects to original storage array 1240. In this way, replica storage array 1210 does not need to copy a large number of snapshots if it has not connected to original storage array 1240 for a long period of time. Instead, replica storage array 1210 may only choose to replicate the most recent snapshot. Alternatively, original storage array 1240 may make a policy decision and notify replica storage array 1210 to pull a given snapshot as embodied in a given medium. Replica storage array 1210 may then choose to pull extents of the given medium from any storage array to which it has access.

In one embodiment, system 1200 may implement a replication mechanism using mediums to avoid copying data. For example, suppose that M is a medium comprising a snapshot S of volume V, and that M' is a medium comprising a later snapshot S' of V. If replica storage array 1210 already contains M, source storage array 1230 may transfer data in M' but not in M to replica storage array 1210 so as to perform the replication process of medium M' Source storage array 1230 may determine which regions fall through and which regions are actually in M' by reading the medium map that it maintains.

In one embodiment, each storage array may utilize a local name for every medium maintained by the storage array, including mediums that originated locally and mediums that were replicated from other storage arrays. For mediums originating from other storage arrays, the local storage array may keep a table mapping original array ID and original medium ID to local medium ID. An example table for mapping original array ID and original medium ID to local medium ID is shown in FIG. 13. Thus, a storage array may look up mediums by original array ID, which is a partial key, and find both the original medium ID and the local medium ID. A storage array may also perform a lookup to the table using both original array ID and original medium ID to get the local medium ID. In another embodiment, each medium in system 1200 could be assigned a globally-unique ID which is the same ID on all storage arrays which utilize or store the medium. This globally-unique ID may then be used as the sole identifier on any storage array of system 1200.

In one embodiment, to replicate a snapshot from original storage array 1240 to replica storage system 1210, the following steps may be taken: First, the anchor medium corresponding to the snapshot on original storage array 1240 may be made stable by taking a snapshot of the volume if necessary. If this anchor medium is already stable, then there is no need to take the snapshot. Next, replica storage system 1210 may initiate the replication process by querying original storage array 1240 for a list of snapshots of the volume that could be replicated. Original storage array 1240 may respond with a list of possible snapshots and corresponding mediums for each snapshot. Then, the medium corresponding to the desired snapshot may be replicated to storage array 1210. This medium may be called Replica storage system 1210 may then contact any source storage system 1230 in system 1200 with the medium M that it wants to replicate. Replica storage system 1210 may utilize its mapping table to identify all of the medium extents that are available for use as sources for deduplicated data, and may also optionally supply this list of medium extents that it maintains locally to source storage system 1230. Again, it is noted that source storage system 1230 may be original storage system 1240, or it may be another storage system to which original storage system 1240 has, directly or indirectly, previously replicated medium M.

Source storage array 1230 may use the list of medium extents and the medium 'M' selected for replication to build a list of information that needs to be sent to replica storage system 1210 to replicate medium M. Each packet of information may be referred to as a "quantum" or an "rblock". An rblock can specify the content of a particular region of M as either medium extents that already exist on replica storage system 1210 or as data that has previously been sent from source storage array 1230 to replica storage system 1210 for M. An rblock can also contain a list of data tuples for M. A tuple may be a combination of block ID and data for the particular region of M. An rblock may also contain a combination of references and data tuples.

Replica storage system 1210 may acknowledge rblocks sent by source storage array 1230. Replica storage system 1210 may batch acknowledgements and send several at once rather than sending an acknowledgement after receiving each rblock.

Acknowledgements may be sent using any suitable technique, including explicit acknowledgement by serial number of each rblock or acknowledging the latest serial number received with no gaps in serial number.

Source storage array 1230 may keep track of the latest rblock that replica storage system 1210 has acknowledged. Source storage array 1230 may discard rblocks that replica storage system 1210 has acknowledged since these will not need to be resent. Source storage array 1230 may add the extents that replica storage array 1210 acknowledges to the list of medium extents that replica storage array 1210 knows about. This list may help reduce the amount of actual data that source storage array 1230 sends to replica storage system 1210 as part of the replication process.

The above-described techniques for performing replication offer a variety of advantages. First, data that source storage array 1230 can determine already exists in a medium extent present on replica storage system 1210 is not sent; instead, source storage array 1230 sends a reference to the already-present data. Second, streamed rblocks do not overlap. Rather, each rblock specifies a disjoint range of content in M. Third, an rblock may only refer to a medium extent that source storage array 1230 knows is on replica storage system 1210, either because it was in the original list of extents sent by replica storage system 1210 to source storage array 1230, or because replica storage system 1210 has acknowledged the extent to source storage array 1230. In some embodiments, replica storage system 1210 may respond that it does not have the referenced extents. In such a case, source storage array 1230 may be requested to resend the extents.

The above-described techniques allow system 1200 to efficiently discover duplicate blocks on source storage array 1230 to produce a correct duplicate. One approach which may be used involves running a differencing algorithm on source storage array 1230 to determine which data blocks must be sent in full and which regions of M can be sent as references to already-extant extents. In one embodiment, for a given extent 'E', an optionally discontiguous set of rblocks with patterns may be sent first, and then a reference rblock may be sent that fully covers the extent E.

A typical medium mapping table may map extents such that <$M_1$,$offset_1$,length> maps to <$M_2$,$offset_2$>, wherein $M_1$ and $M_2$ are two separate mediums and $offset_1$ and $offset_2$ are the offsets within those mediums. It may be challenging to determine whether a particular medium is reachable multiple ways using the individual medium extent map that maps <$M_1$,$offset_1$,length>→<$M_2$,$offset_2$>. In other words, it may be challenging to determine if other medium extents also point to <$M_2$,$offset_2$>. To address this problem, a set $D_1$ of medium extents that are mapped to one another may be built. Thus, this set would include all instances of <$M_D$,$offset_D$> that are pointed to by more than one <M,offset>. This set may allow a merge of all references to the duplicated medium extent <$M_D$,$offset_D$> by ensuring that all references to blocks in the region refer to the canonical extent $M_D$, rather than to whatever medium they were in that points to $M_D$.

It may also be challenging to determine whether a particular block is a duplicate by resolving it through the medium maps, since translating a given <medium, block> results in a physical address. If blocks <$M_1$, $s_1$> and <$M_2$, $s_2$> both correspond to physical address X, it may be difficult to know when we resolve <$M_1$, $s_1$> that there are other blocks with address X. In other words, working backwards from X to the <medium, block> addresses that refer to it may be problematic. To mitigate these challenges, a set $D_2$ of medium extents may be built that are duplicates of other medium extents. This set may indicate what ranges in different mediums actually correspond to the same blocks, whether by entries in the medium table or by fully resolving the addresses. Any suitable method for building this set $D_2$ of medium extents may be utilized, depending on the embodiment. The two sets of $D_1$ and $D_2$ may be combined into a combined set D of duplicate medium extents.

Once a set of duplicate references has been built, source storage array 1230 may determine which blocks need to be sent to replica storage array 1210. Source storage array 1230 may determine which blocks need to be sent by performing the following steps: First, the set of duplicate extents D may be provided as previously described. Next, a set of sectors Z that replica storage array 1210 already knows about are initialized by inserting all of the sector ranges covered by the medium extents that replica storage array 1210 sent to source storage array 1230.

Next, a set of mappings P from physical addresses (X) to logical addresses (<M,s>) may be initialized to be empty. Each time actual data is sent to replica storage array 1210, the corresponding mapping may be added to set P. Then, for each sector 's' in M, call a function emit_sector (M,s). Once sufficient information has been emitted, the information may be packaged into an rblock and sent to replica storage array 1210. In one embodiment, the function emit_sector (M,s) may traverse the medium extent table until one of the following three cases (a, b, c) happens. Checking for these three cases may be performed in logical order. For example, the checks may be run in parallel, but case a takes precedence over case b, and case b takes precedence over case c.

The three cases (a, b, c) mentioned above are as follows: First, case a is the following: <M,s> maps to a sector in Z called <Q,t>. In this case, emit a reference <M,s>→<Q,t>. Second, case b is the following: A sector <F,t> is hit that's in D, where F≠M. This means that a medium extent map in the medium mapping table has been traversed to a different medium, and an entry has been hit which allows the medium map to be "flattened" to optimize transmission. Flattening the medium map means that a duplicate entry is being deleted and both entries may now point to the same extent. In this case, emit_sector(F,t) may be called, and then a reference <M,s>→<F,t> may be emitted.

Third, case c is the following: An actual physical mapping X is hit that contains the data for the sector. There are two options when this occurs. If P already contains a mapping from X→<O,t>, then emit a reference from <M,s>→<O,t>. Otherwise, emit the logical address of the sector—<M,s>—followed by the data for the sector. Also, add the mapping from X to <M,s> to P to allow for deduplicating on the fly to save bandwidth on the network.

In one embodiment, an optimization may be utilized. This optimization includes maintaining a list of recently sent physical addresses that map physical location X to <M,s>. This list may be used to do fine-grained deduplication on the fly. In option c above, first the list of recently-sent physical addresses may be checked. If it is discovered that <$M_2,s_2$> corresponds to physical address Y, and Y was recently sent as <$M_1,s_1$>, a reference may be sent from <$M_2,s_2$> to <$M_1,s_1$>. This step is purely optional, and the size of the list of recently-sent physical addresses can be as large or as small (including zero) as desired, with larger lists resulting in potentially less data being sent. The list of recently-sent addresses may be trimmed at any time, and any mappings may be removed. The use of table P may be omitted entirely if desired, with the only drawback being that fine grained duplicates might be sent multiple times over the network.

Another optimization is that adjacent references may be merged to save space. For example, if the references <M,s>→<O,t> and <M,s+1>→<O,t+1> were going to be sent, <M,s,2>→<O,t> could be sent instead, where the number 2 indicates the number of sectors covered by this mapping. This optimization may be used at any time. For example, if the mapping table indicates that a mapping applies for the next 16 sectors, a single mapping may be emitted that covers the next 16 sectors. This avoids having to emit 16 individual mappings and then merge them later.

It is noted that the transmission of data and mappings from source storage array 1230 to replica storage array 1210 may be performed using any suitable network mechanism. Similarly, acknowledgments may be sent using any suitable mechanism for acknowledgment, including the use of sequence numbers or implicit acknowledgment built into network protocols.

The above-described mechanisms may be used to back up data to a "slower" storage device such as disk or tape. This backup can proceed at full sequential write speeds, since all of the network traffic on the backup destination (replica storage array 1210) may be recorded to keep track of the medium extents that are stored there. Resolving references to data stored on disk or tape could be slow using this approach. However, since network traffic is being recorded, data does not need to be processed on replica storage array 1210. Instead, all of the packets that source storage array 1230 sends to replica storage array 1210 may be sequentially recorded, and minimal processing of metadata from the rblocks may be performed. Then, if a restore is needed, all of the replication sessions may be replayed to original storage array 1240 or to another storage array.

Restoring data to another storage array could be achieved by replaying all of the desired replication streams from backup storage, in order. For example, suppose that daily replication of data was performed for every day of the month of August, with the initial replication of the volume being sent on August $1^{st}$. If a user wanted to restore the system as it looked on August 15, all of the stored streams for August 1-15 may be replayed.

The above-described mechanisms may be used to back up data to the cloud. Cloud storage may be used to preserve copies of all of the rblocks that would have been sent from source storage array 1230 to replica storage array 1210, and the cloud-based system may acknowledge medium extents as it receives the rblocks that contain them. A unique identifier may be assigned to each rblock, allowing a cloud-based system to efficiently store all of the rblocks, retrieving them as necessary to perform a restore from backup.

The mechanisms described herein deal may easily handle complex replication topologies. For example, suppose an original storage site is in London, with replicas in New York and Boston. The original pushes its data out to New York first. When Boston decides to replicate a snapshot, it can contact either London or New York to discover what snapshots are available for replication. Boston can then retrieve data from either London, New York, or parts from both, making the choice based on factors such as available network capacity and available system capacity (how busy the systems are). In other words, a replica storage array can pull from any source storage array that has the desired medium extents, not just the original storage array.

For example, Boston could decide to start retrieving data for snapshot S from London, but stop in the middle and switch to New York if the network connection to London became slow or the system in London became more heavily loaded. The system in New York can associate the London medium identifiers with data it has stored locally, and resume the transfer. Similarly, the system in Boston might identify the snapshot at New York initially, perhaps picking the latest snapshot stored in New York, bypassing London entirely. Boston may also contact London to identify the latest snapshot, but conduct the entire transfer with the New York replica.

Additionally, replication may also be used to preload a system with various mediums. This can be done even if it is never intended to replicate the volumes that currently use the mediums that are being preloaded. For example, mediums could be preloaded that correspond to "gold master" images of virtual machines that are commonly cloned. Then, when a new clone of the gold master is created, future replications would go very quickly because they can refer to the mediums that the replica was preloaded with. This preloading could be done with the storage arrays in close proximity, with the replica storage array then moved to a remote location. Also, coarse-grained deduplication may be performed after the fact on the preloaded data, further optimizing replication to a preloaded replica.

Turning now to FIG. 13, one embodiment of a table 1300 for mapping original system ID to local medium ID. Table 1300 is an example of a table which may be utilized by replica storage array 1210 (of FIG. 12). Table 1300 includes mediums that originated on storage arrays 1230 and 1240 and which are also stored on replica storage array 1210. The IDs of these mediums may be different on replica storage array 1210 than the IDs of these mediums on their original storage arrays, and so replica storage array 1210 may utilize table 1300 to map IDs from the host storage array to its own IDs. It is noted that table 1300 is merely one example of a table which may be utilized to map medium IDs from an original storage array to a local storage array. In other embodiments, table 1300 may be organized differently. It is also noted that other systems may have other numbers of storage arrays, and in these embodiments, table 1300 may have other numbers of IDs of storage arrays which are mapped to the local storage array. It is further noted that table 1300 would be unnecessary if mediums have globally unique identifiers (GUIDs). In one embodiment, a GUID may include an indication of the system that originally generated the medium (e.g., the system ID may be the upper 32 bits of the medium ID).

Referring now to FIG. 14, one embodiment of a set of tables and lists utilized during a replication process is shown. It may be assumed for the purposes of this discussion that medium 1410 has been selected for replication from an original storage array to a replica storage array. Table 1400 includes medium mapping table entries for medium 1410, and the entries in table 1400 for medium 1410 are intended to represent all of the entries corresponding to medium 1410 in the overall medium mapping table (not shown) of the original storage array. The original storage array may build table 1400 by traversing the overall medium mapping table for all entries assigned to medium 1410. Alternatively, the original storage array may not build table 1400 but may access the entries corresponding to medium 1410 from the overall medium mapping table. In that case, table 1400 is intended to illustrate the relevant medium mapping table entries for a medium 1410 selected for replication. The total range of medium 1410 is from 0 to (N−1), and medium 1410 may include any number of entries, depending on the embodiment.

Once medium 1410 has been selected for replication, the replica storage array may generate a list of medium extents stored on the replica storage array that originated from the original storage array. Table 1465 is intended to represent the mapping of external storage array medium IDs to local medium IDs on the replica storage array. For the purposes of this discussion, it may be assumed that the original storage array has an ID of 1445. As shown, there is a single entry for storage array 1445 in table 1465. This entry maps original medium ID 1425 from the original storage array to local medium ID 36 on the replica storage array. It is noted that a typical table may have a large number of entries corresponding to the original storage array. However, a single entry is shown in table 1465 for ease of illustration. The medium mapping table entry for medium ID 36 is shown in table 1470, which is intended to represent the medium mapping table of the replica storage array. Alternatively, in another embodiment, each medium may have a globally unique ID, and mediums may be identified by the same globally unique ID on different storage arrays. In this embodiment, the replica storage array may simply look for entries assigned to medium ID 1410 in its medium mapping table.

List 1415A is intended to represent an example of a list which may be sent from the replica storage array to the original storage array. The replica storage array may generate list 1415A by querying table 1465 which maps external storage array medium IDs to local medium IDs and compiling a list of medium extents corresponding to snapshots that originated on the original storage array. The replica storage array may send list 1415A to the original storage array, and then the original storage array may filter out all medium extents that do not correspond to medium 1410 and keep only the medium extents which map to extents within medium 1410. Any number of entries may be included in list 1415A, depending on the embodiment.

As part of the replication process, the original storage array may determine which extents of medium ID 1410 need to be sent to the replica storage array and which extents can be sent as references to extents already stored on the replica storage array. Extents which can be sent as references to already-existent extents may be identified using any of a variety of techniques. For instance, if a first extent in table 1400 corresponds to an extent stored in list 1415A, then a reference to the extent of list 1415A may be sent to the replica storage array rather than sending the first extent. Also, if duplicate extents are discovered in table 1400, then a reference from a second extent to a third extent may be sent to replica storage array rather than sending the second extent. The original storage array may utilize any of a variety of techniques for determining if there are duplicate extents in list 1425. Additionally, if duplicate extents are discovered in table 1400, then these duplicate extents may be deduplicated as a side benefit of the replication process.

For example, in one embodiment, the original storage array may build up a list of duplicate extents that have been detected within medium 1410. In order to build list 1430 of duplicate extents, the original storage array may traverse table 1400 entry by entry to determine the underlying mappings which exist for each extent. For example, the fourth entry of table 1400 may be traversed down to its underlying medium of 650. Then, a lookup of the overall medium mapping table 1455 may be performed for the specified range of medium ID 650 to determine if medium ID 650 has an underlying medium. The second entry of medium mapping table 1455 shows the corresponding entry for this specific range of medium ID 650. In this case, the range of C to (D−1) of medium ID 650 has an underlying medium of 645 at an offset of 0 after applying the offset of −C from the entry in table 1455. Therefore, the extent corresponding to the fourth entry of table 1400 is a duplicate extent since it maps to the same extent as the third entry of table 1400. Accordingly, an entry may be recorded in duplicate extents table 1430 corresponding to the fourth and third entries of table 1400. Additionally, after detecting these duplicate extents, the medium mapping table entry for range C to (D−1) of medium ID 1410 may be collapsed. Although not shown in FIG. 14, the corresponding entry of the medium mapping table may be modified to point to range 0 to (A−1) of medium ID 645 rather than having it point to range C to (D−1) of medium ID 650. This helps create a shortcut for the medium mapping table, which is an additional side benefit of performing the replication process for medium ID 1410.

Additionally, duplicate extents table 1430 may keep track of duplicate blocks within medium ID 1410 that map to the same physical address. When separate blocks that point to the same physical address are detected, an entry may be stored in duplicate extents table 1430 for the duplicate pair of blocks. Duplicate blocks may be detected by performing a lookup of the address translation table (not shown) for each block within medium 1410 and compiling a list of the physical pointer values returned from each of the lookups. For each pair of matching physical pointer values which are found, an entry may be recorded in duplicate extents table 1430. It may be assumed for the purposes of this discussion that the block corresponding to medium ID 1410 for range D to (E−1) is a duplicate block which has the same physical pointer value as the block corresponding to medium 1410 for range M to (N−1). Therefore, the second entry of duplicate extents table 1430 stores the mapping of these duplicate blocks.

Also, a physical to logical address mappings table 1460A may be created to store physical to logical mappings of data that is sent to the replica storage array. The physical to logical address mappings table 1460A may be initialized to be empty and mappings may be added after the actual data is sent to the replica storage array. Once duplicate extents table 1430 and physical to logical address mappings table 1460A have been created, the original storage array may traverse table 1400 entry by entry and determine for each entry if the actual data needs to be sent or if a reference to an already-existent extent on the replica storage array may be sent.

While traversing table 1400 for each sector of medium ID 1410, multiple conditions may be checked for each sector. First, it may be determined if the sector of medium ID 1410 maps to a sector in list 1415A. If the sector maps to one of the sectors indicated by list 1415A, then a reference to this sector from list 1415A may be sent to the replica storage array. For example, for the first entry of table 1400, a lookup of list 1415A will hit for this sector of medium ID 1425 corresponding to range 0-(A−1). As can be seen from the first entry of medium mapping table 1455, range 0 to (A−1) of medium ID 1425 maps to range 0 to (A−1) of medium 1410. Therefore, rather than sending the data for this sector to the replica storage array, a reference to the sector which already exists on the replica storage array may be sent.

After checking for the first condition and determining the first condition is not met, a second condition may be checked for a given sector of medium ID 1410. The second condition includes checking if the sector of medium ID 1410 maps to a sector in duplicate extents table 1430. If the sector of medium ID 1410 already maps to a sector in duplicate extents table 1430 which has already been sent to and acknowledged by the replica storage array, then a reference to the duplicate sector may be sent to the replica storage array. For example, for the fourth entry of table 1400 corresponding to range C to (D−1) of medium 1410, an entry exists in duplicate extents table 1430 for this range of medium 1410. Therefore, a reference to the range listed in the duplicate range column of table 1430, or range B-(C−1), may be sent to the replica storage array rather than sending the actual data. Similarly, for the last entry in table 1400 corresponding to range M-(N−1), a reference to range D-(E−1) (as indicated by the second entry in table 1430) may be sent to the replica storage array rather than sending the actual data of range M-(N−1).

If the second condition is not met, then the actual physical mapping that contains the data for the sector may be located by performing a lookup of the address translation table. Once the specific physical mapping has been located, then a lookup of physical to logical address mappings table 1460A may be performed to determine if the physical mapping is already stored in table 1460A. If the physical mapping is already stored in table 1460A, then a reference to the sector indicated by the corresponding entry of table 1460A may be sent to the replica storage array. In one embodiment, the reference may be in the form of <medium ID, range>. If the physical mapping is not already stored in table 1460A, then the actual data for the sector may be sent to the replica storage array and then this physical mapping may be added to table 1460A.

After the replica storage array receives a reference or data from the original storage array, the replica storage array may send an acknowledgement to the original storage array. In some cases, the replica storage array may batch acknowledgements and send multiple acknowledgements at a time rather than sending each acknowledgement individually. Alternatively, the replica storage array may send an acknowledgement in the form of "received all data up to medium X, offset Y". When the original storage array receives an acknowledgment for a given extent, the original storage array may then add the given extent to list 1415A.

It is to be understood that only a portion of each of tables and lists 1400, 1415, 1430, and 1455 are shown, with the portion being relevant to the above discussion. It is noted that each of the tables and lists of FIG. 14 may be implemented in a variety of ways with additional information than what is shown and/or with more entries than are shown. It is also noted that any suitable data structure may be used to store the data shown in the tables and lists of FIG. 14.

Turning now to FIG. 15, one embodiment of a set of tables and lists for use in the replication process is shown. The tables and lists shown in FIG. 15 and the following discussion is a continuation of the replication example described in FIG. 14. In one embodiment, the original storage array may generate table 1500 prior to replicating medium ID 1410 to keep track of which extents need to be sent as data and which extents should be sent as references to other extents. Alternatively, the original storage array may generate table 1500 incrementally as replication proceeds. As shown in FIG. 15, table 1500 is generated based on the information contained in the tables shown in FIG. 14 for medium ID 1410. Using the information stored in table 1400, list 1415A, and duplicate extents table 1430, the original storage array may generate table 1500 and store an indication for each extent as to whether it should be sent as a reference or as data.

For example, the first extent of medium ID 1410 for range 0 to (A−1), corresponding to the first entry in table 1500, may be sent as a reference since this extent is already stored (as range 0 to (A−1) of medium ID 1425) on the replica storage array as indicated by the first entry of list 1415A. The second extent of medium ID 1410 may be sent as data since this extent does not map to an entry in list 1415A or duplicate extents table 1430. After the original storage array receives an acknowledgement from the replica storage array that is has received the data corresponding to the second extent of medium ID 1410, the original storage array may add this extent to list 1415 since this extent is now stored on the replica storage array. List 1415B represents list 1415 at the point in time after the original storage array receives the acknowledgement from the replica storage array regarding the second extent of medium ID 1410. Similarly, anytime an acknowledgement is sent by the replica storage array and received by the original storage array regarding a given extent, the given extent may be added to list 1415 at that time.

The third extent of medium ID 1410 may be sent as data since this extent does not map to an entry in list 1415B or duplicate extents table 1430. The fourth extent of medium ID 1410 may be sent as a reference to the third extent of medium ID 1410 since the fourth extent is the same as third extent as indicated by duplicate extents table 1430. The fifth extent of medium ID 1410 may be sent as data since this extent does not map to an entry in list 1415B or duplicate extents table 1430. Any number of extents after the fifth extent may be sent in a similar manner. Finally, the last extent of medium ID 1410 may be sent as a reference since this extent is the same as fifth extent as indicated by duplicate extents table 1430. After acknowledgements are received by the original storage array for the third and fifth extents of medium ID 1410, these extents may be added to list 1415. List 1415C represents list 1415 after these acknowledgements have been received by the original storage array.

Additionally, physical to logical address mappings table 1460 may be updated after the data for the extents of the second, third, and fourth entries is sent to the replica storage array. As shown in table 1460B, the physical address of the second entry (sector <1410, 1>) is represented as 1462X, the physical address of the third entry (sector <1410, 2>) is represented as 1463X, and the physical address of the fourth entry (sector <1410, 3>) is represented as 1464X.

A lookup of physical to logical address mappings table 1460B may be performed for subsequent entries of table 1500 prior to sending data to the replica storage array. Alternatively, in another embodiment, a list of recently sent physical addresses may be maintained. The size of the list of recently sent physical addresses may be as large or as small as desired, depending on the embodiment. If it is discovered that the address for a sector is located in table 1460B (or the list of recently sent physical addresses), then a reference to the previously sent sector may be sent to the replica storage array rather than the corresponding data. Also, if an address for a sector is already stored in table 1460B, fine-grained deduplication may be performed on these two sectors since they both point to the same physical address. This allows for an additional side benefit of the replication process of enabling fine-grained deduplication to be performed on the fly.

Figure 16:
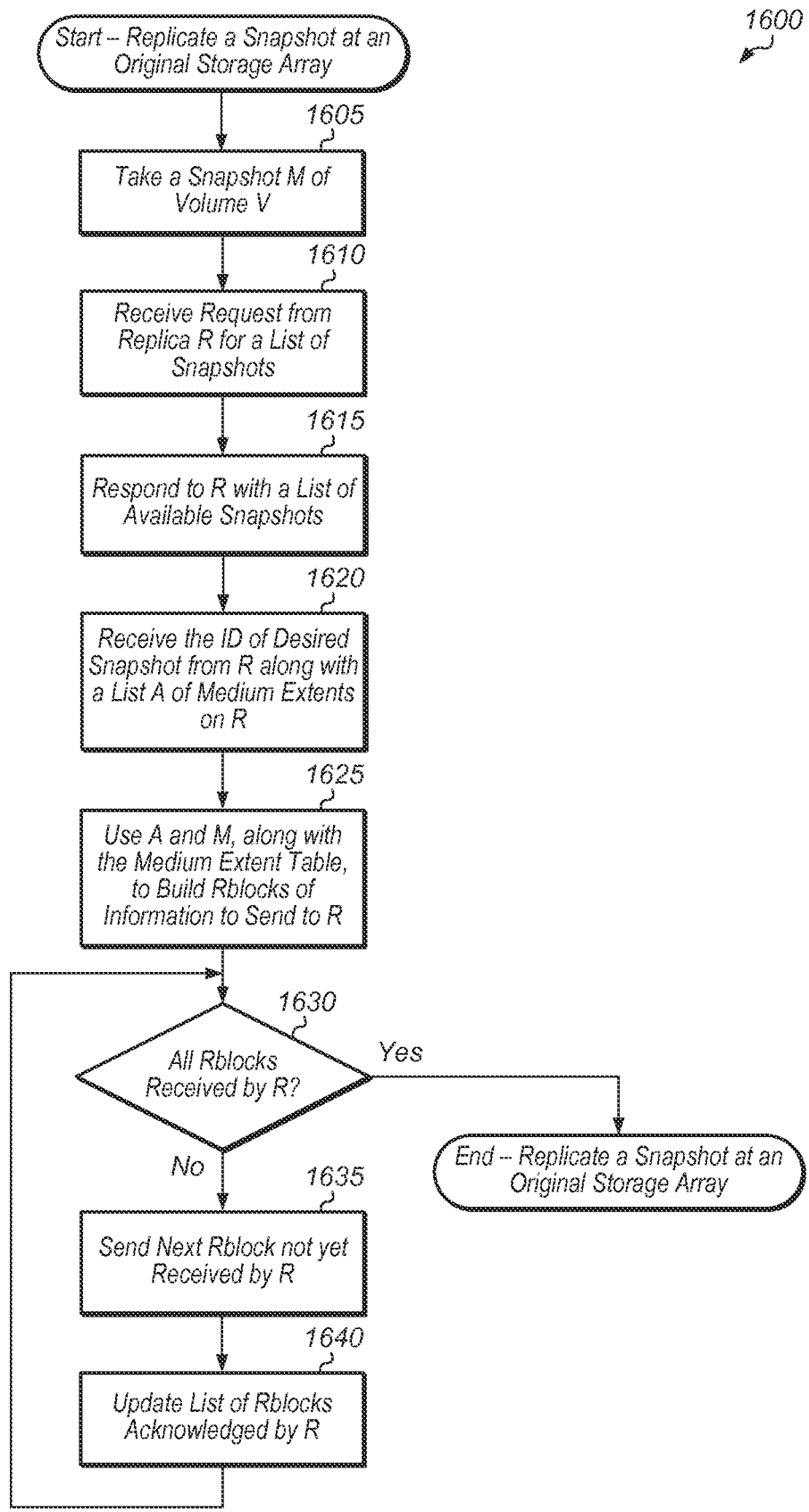
FIG. 16 is a generalized flow diagram illustrating one embodiment of a method for replicating a snapshot at an original storage array.

Referring now to FIG. 16, one embodiment of a method 1600 for replicating a snapshot at an original storage array is shown. The components embodied in system 100 described above (e.g., storage controller 110) may generally operate in accordance with method 1600. In addition, the steps in this embodiment are shown in sequential order. However, some steps may occur in a different order than shown, some steps may be performed concurrently, some steps may be combined with other steps, and some steps may be absent in another embodiment.

An original storage array may take a snapshot 'M' of a volume 'V' (block 1605). It is noted that block 1605 may only be performed if needed. For example, if M is already stable, then a snapshot does not need to be taken. Next, the original storage array may receive a request from a replica storage array 'R' for a list of snapshots (block 1610). The original storage array may respond to R with a list of available snapshots including M (block 1615). The original storage array may then receive an ID of a desired snapshot from R along with a list 'A' of medium extents that are already stored on R (block 1620). The original storage array may then use A and M, along with the medium extent table, to build rblocks of information to send to R (block 1625).

The original storage array may check to determine if all rblocks have been received by R (conditional block 1630). If all rblocks have been received by R (conditional block 1630, "yes" leg), then method 1600 is finished. If not all of the rblocks have been received by R (conditional block 1630, "no" leg), then the original storage array may send the next rblock not yet received by R (block 1635). Then, the original storage array may update the list of rblocks acknowledged by R (block 1640). After block 1645, method 1600 may return to block 1630. It is noted that replica storage array 'R' may also receive rblocks from one or more source storage arrays other than the original storage array. It is noted that the original storage array may retransmit rblocks which are not acknowledged.

Figure 17:
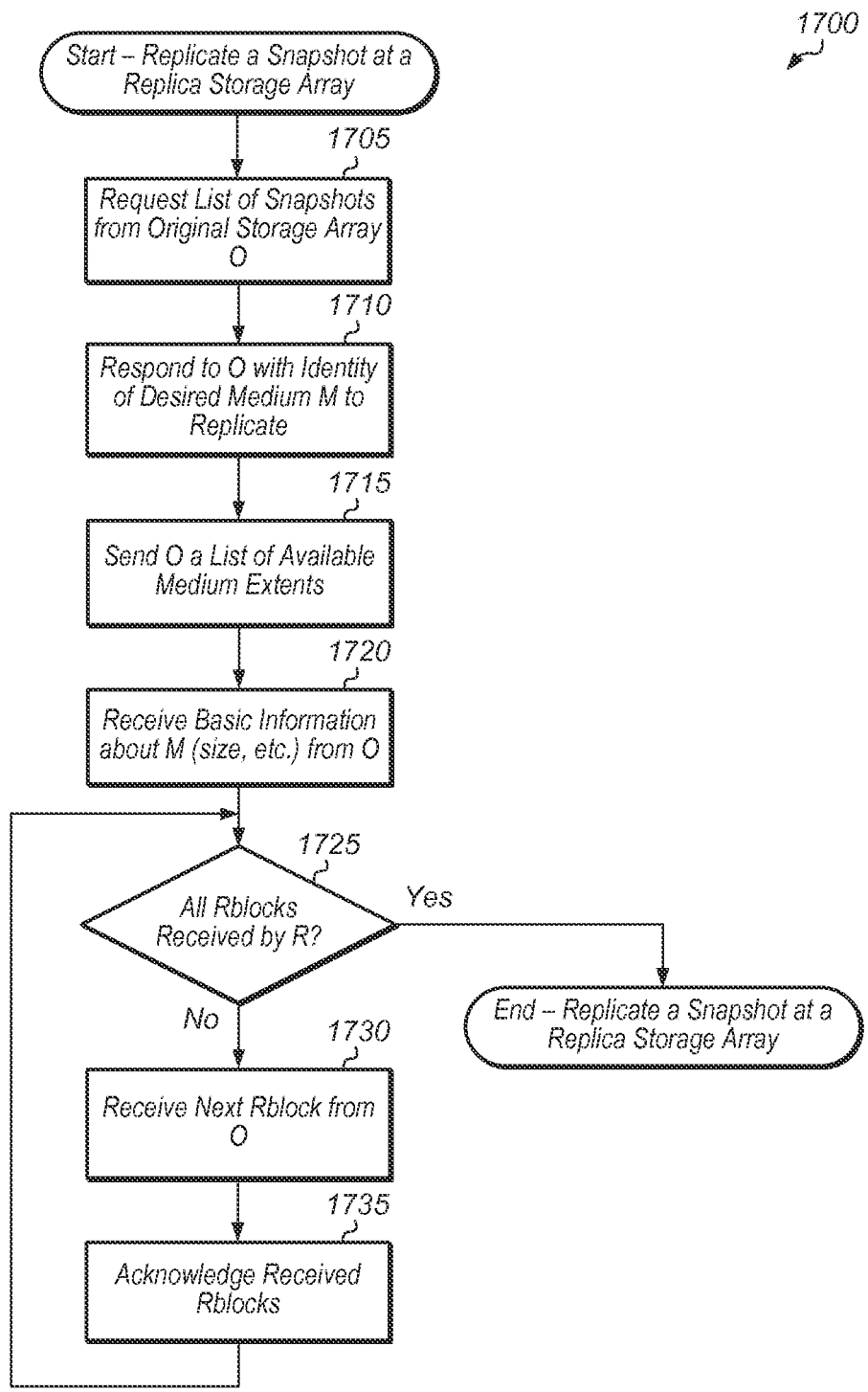
FIG. 17 is a generalized flow diagram illustrating one embodiment of a method for replicating a snapshot at a replica storage array.

Turning now to FIG. 17, one embodiment of a method 1700 for replicating a snapshot at a replica storage array is shown. The components embodied in system 100 described above (e.g., replica storage array 160) may generally operate in accordance with method 1700. In addition, the steps in this embodiment are shown in sequential order. However, some steps may occur in a different order than shown, some steps may be performed concurrently, some steps may be combined with other steps, and some steps may be absent in another embodiment.

The replica storage array 'R' may request a list of snapshots from the original storage array 'O' (block 1705). After receiving the list of snapshots, R may respond to O with the identity of the desired medium 'M' to replicate (block 1710). R may also send O a list of available medium extents which are already stored on R (block 1715). R may receive basic information (e.g., size) about the desired medium 'M' from O (block 1720).

R may determine if it has received all rblocks of M (conditional block 1725). If R has received all rblocks of M (conditional block 1725, "yes" leg), then method 1700 may be finished (block 1720). If R has not received all rblocks of M (conditional block 1725, "no" leg), then R may receive the next rblock from O or from another source storage array (block 1730). Then, R may acknowledge the received rblock (block 1735). Alternatively, R may perform bulk acknowledgements. After block 1735, method 1700 may return to block 1725.

Figure 18:
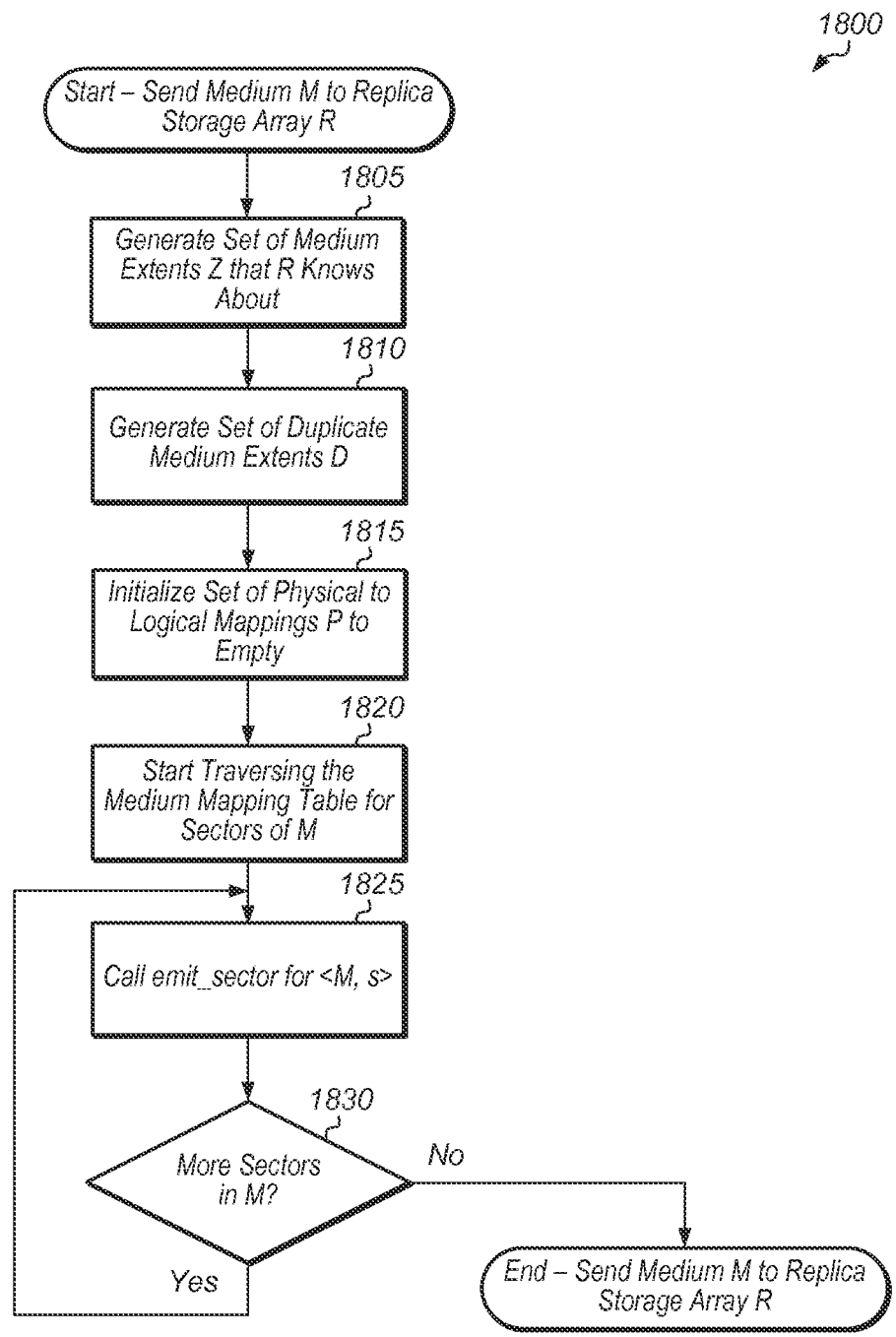
FIG. 18 is a generalized flow diagram illustrating one embodiment of a method for sending a medium 'M' to a replica storage array 'R'.

Referring now to FIG. 18, one embodiment of a method 1800 for sending a medium 'M' to a replica storage array 'R' is shown. The components embodied in system 100 described above (e.g., storage controller 110) may generally operate in accordance with method 1800. In addition, the steps in this embodiment are shown in sequential order. However, some steps may occur in a different order than shown, some steps may be performed concurrently, some steps may be combined with other steps, and some steps may be absent in another embodiment.

The original storage array 'O' may generate a set of extents 'Z' that the replica storage array 'R' knows about (block 1805). A set of duplicate medium extents 'D' of the desired medium 'M' may also be generated (block 1810). This set D may include pairs of extents which map to the same underlying extent as well as pairs of extents that map to the same physical pointer value. Also, a set of physical to logical mappings 'P' may be initialized to empty (block 1815). Next, O may start traversing the medium mapping table for sectors of M (block 1820). When selecting a sector 's' of the medium mapping table for medium 'M', O may generate a call to emit_sector for <M, s> (block 1825). The implementation of emit_sector is described below in method 1900 (of FIG. 19) in accordance with one embodiment. In one embodiment, emit_sector may be implemented using a software routine. In another embodiment, emit_sector may be implemented in logic. In a further embodiment, any combination of software and/or hardware may be utilized to implement emit_sector.

After block 1825, O may determine if there are more sectors in 'M' (conditional block 1830). If there are more sectors in 'M' (conditional block 1830, "yes" leg), then a call to emit_sector for <M, s> may be generated for the next sector (block 1825). If there are no more sectors in 'M' (conditional block 1830, "no" leg), then method 1800 may end.

Figure 19:
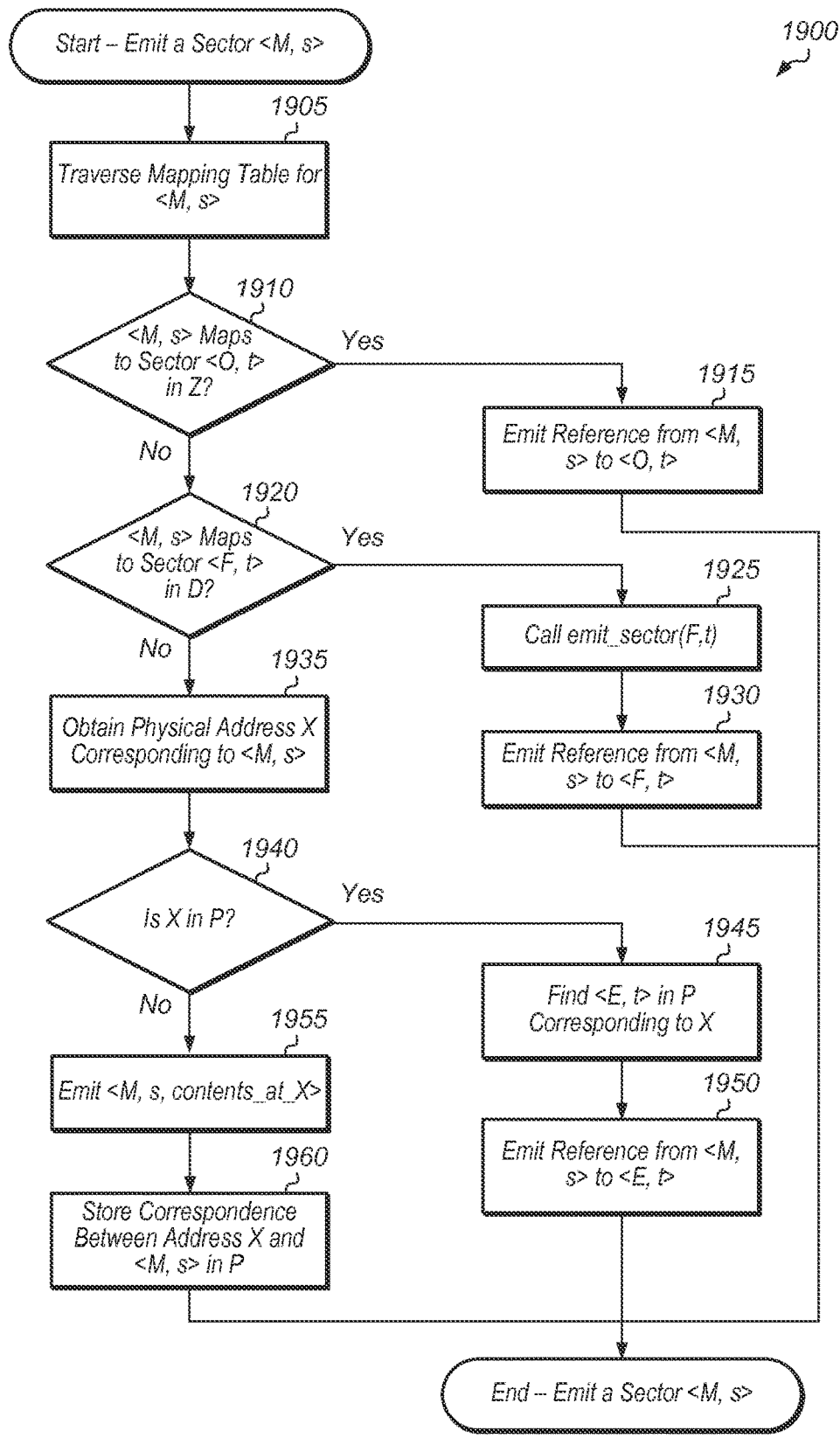
FIG. 19 is a generalized flow diagram illustrating one embodiment of a method for emitting a sector <M, s>.

Referring now to FIG. 19, one embodiment of a method 1900 for emitting a sector <M, s> is shown. The components embodied in system 100 described above (e.g., storage controller 110) may generally operate in accordance with method 1900. In addition, the steps in this embodiment are shown in sequential order. However, some steps may occur in a different order than shown, some steps may be performed concurrently, some steps may be combined with other steps, and some steps may be absent in another embodiment.

The original storage array 'O' may traverse the mapping table for <M, s> (block 1905). If <M, s> maps to sector <O, t> in Z (conditional block 1910, "yes" leg), then the reference from <M, s> to <O, t> may be emitted (block 1915). It is noted that 'Z' is the set of extents that the replica storage array 'R' already stores and which originated from O, and R may send a list of the set of extents Z to O. After block 1915, method 1900 may end.

If <M, s> does not map to sector <O, t> in Z (conditional block 1910, "no" leg), then it may be determined if <M, s> maps to sector <F, t> in duplicate medium extents 'D' (conditional block 1920). If <M, s> maps to sector <F, t> in D (conditional block 1920, "yes" leg), then a call to emit_sector for <F, t> may be generated (block 1925). After block 1925, the reference from <M, s> to <F, t> may be emitted (block 1930). After block 1930, method 1900 may end.

If <M, s> does not map to a sector <F, t> in D (conditional block 1920, "no" leg), then the physical address 'X' corresponding to <M, s> may be obtained from the address translation table (block 1935). Next, it may be determined if X is in the physical to logical mappings 'P' (conditional block 1940). The physical to logical mappings list 'P' is a list of physical to logical mappings corresponding to data that has already been sent to R. If X is in the physical to logical mappings 'P' (conditional block 1940, "yes" leg), then the sector <E, t> in P corresponding to X may be found (block 1945). Next, the reference from <M, s> to <E, t> may be emitted (block 1950). After block 1950, method 1900 may end.

If X is not in the physical to logical mappings 'P' (conditional block 1940, "no" leg), then the sector data corresponding to <M, s, contents at X> may be emitted (block 1955). After block 1955, the correspondence between address X and <M, s> may be stored in P (block 1960). After block 1960, method 1900 may end.

Figure 20:
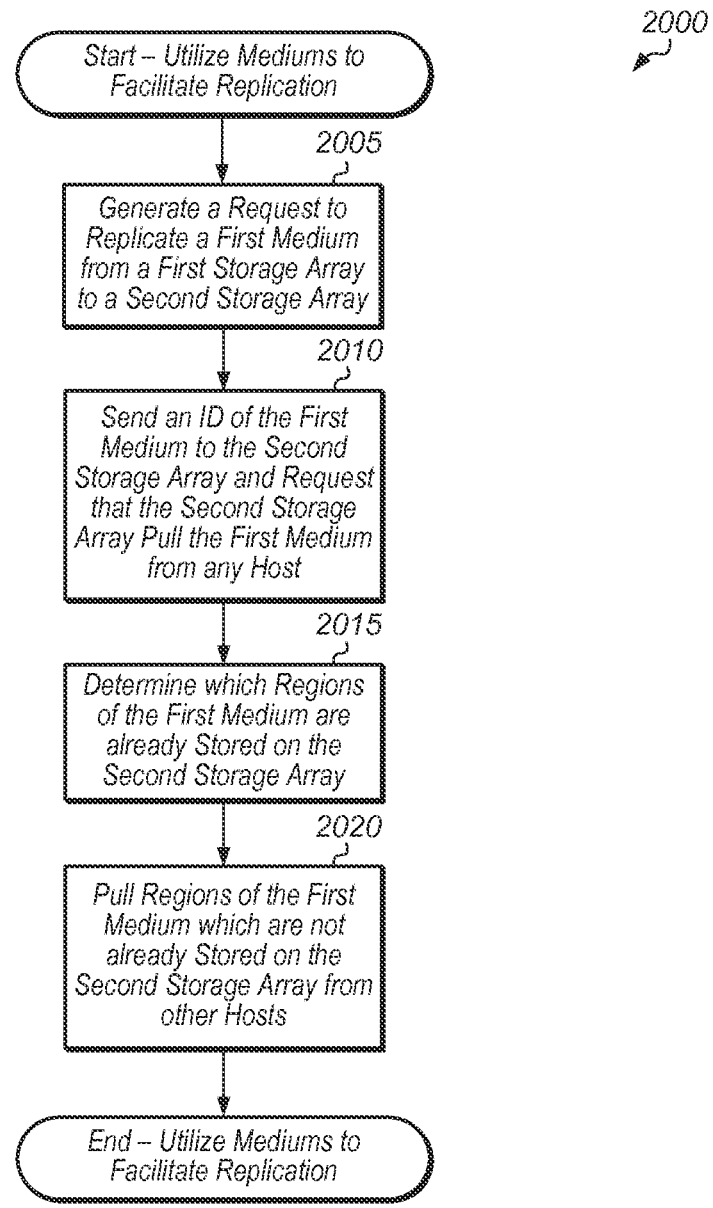
FIG. 20 is a generalized flow diagram illustrating one embodiment of a method for utilizing mediums to facilitate replication.

Referring now to FIG. 20, one embodiment of a method 2000 for utilizing mediums to facilitate replication is shown. The components embodied in system 100 described above (e.g., storage controller 110) may generally operate in accordance with method 2000. In addition, the steps in this embodiment are shown in sequential order. However, some steps may occur in a different order than shown, some steps may be performed concurrently, some steps may be combined with other steps, and some steps may be absent in another embodiment.

In one embodiment, a request to replicate a first medium from a first storage array to a second storage array may be generated (block 2005). The request may be generated by the first storage array or the second storage array, depending on the embodiment. It may be assumed for the purposes of this discussion that the first medium is already read-only. If the first medium is not read-only, then a snapshot of the first medium may be taken to make the first medium stable.

Next, in response to detecting this request, the first storage array may send an identifier (ID) of the first medium to the second storage array and request that the second storage array pull the first medium (or portions thereof) from any host to which it has access (block 2010). Alternatively, the first storage array may notify the second storage array that the first storage array will push the first medium to the second storage array. In one embodiment, the first medium may be identified based only by this medium ID. In one embodiment, the ID of the first medium may be a numeric value such as an integer, although the ID may be stored as a binary number. Also, in some embodiments, the age of a given medium relative to another medium may be determined based on a comparison of the IDs of these mediums. For example, for two mediums with IDs 2017 and 2019, medium ID 2017 has a lower ID than medium ID 2019, so therefore, it may be recognized that medium ID 2017 is older (i.e., was created prior to) than medium ID 2019.

After receiving the ID of the first medium and the request to pull the first medium from any host, it may be determined which regions of the first medium are already stored on the second storage array (block 2015). In one embodiment, the second storage array may identify regions which originated from the first storage array and which are already stored on the second storage array, and then the second storage array may send a list of these regions to the first storage array. The first storage array may then use this list to determine which regions of the first medium are not already stored on the second storage array. Then, the first storage array may send a list of these regions to the second storage array. In other embodiments, other techniques for determining which regions of the first medium are not already stored on the second storage array may be utilized.

After block 2015, the second storage array may pull regions of the first medium which are not already stored on the second storage array from other hosts (block 2020). For example, the second storage array may be connected to a third storage array, and the second storage array may send a list of regions it needs to the third storage array and request that the third storage array send any regions from the list which are stored on the third storage array. It is noted that in another embodiment, the above-described steps of method 2000 may be utilized for replicating the first medium from the first storage array to a cloud service rather than to the second storage array.

Figure 21:
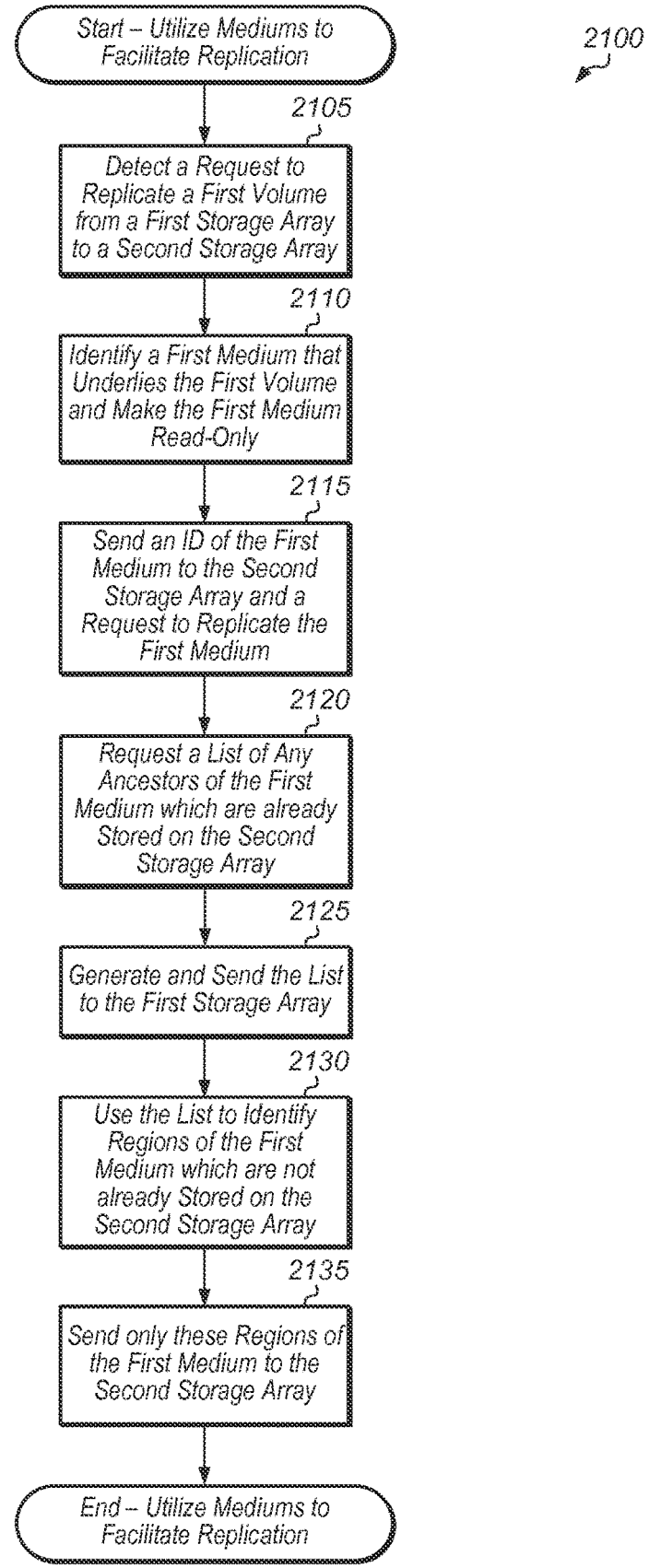
FIG. 21 is a generalized flow diagram illustrating another embodiment of a method for utilizing mediums to facilitate replication.

Referring now to FIG. 21, another embodiment of a method 2100 for utilizing mediums to facilitate replication is shown. The components embodied in system 100 described above (e.g., storage controller 110) may generally operate in accordance with method 2100. In addition, the steps in this embodiment are shown in sequential order. However, some steps may occur in a different order than shown, some steps may be performed concurrently, some steps may be combined with other steps, and some steps may be absent in another embodiment.

A request to replicate a first volume from a first storage array to a second storage array may be detected (block 2105). In one embodiment, the first storage array may decide to replicate the first volume to the second storage array. Alternatively, in another embodiment, the second storage array may request for the first volume to be replicated. In response to detecting the request to replicate the first volume, the first storage array may identify a first medium that underlies the first volume and make the first medium read-only (block 2110). In one embodiment, the first medium may be made read-only by taking a snapshot of the first volume. Next, the first storage array may send an identifier (ID) of the first medium to the second storage array along with a request to replicate the first medium (block 2115). In various embodiments, the request to replicate the first medium may be implicit or it may be an actual command. In some cases, the request to replicate the first medium may indicate if the first storage array will be pushing data to the second storage array, or if the second storage array will be pulling data from the first storage array and any other storage arrays. It may be assumed for the purposes of this discussion that the first storage array will be pushing data to the second storage array during the replication process. However, in other embodiments, the second storage array may pull data from the first storage array and other storage arrays.

The first storage array may request a list of any ancestors of the first medium which are already stored on the second storage array (block 2120). Alternatively, the first storage array may request a list of any read-only mediums which are older than the first medium. In one embodiment, the second storage array may identify mediums older than the first medium by selecting medium IDs which are lower than the first medium ID. For example, if the first medium ID is 1520, then the second storage array may identify all read-only mediums with IDs lower than 1520 which are stored on the second storage array. In a further embodiment, the first storage array may request an ID of the youngest read-only medium stored on the second storage array which is older than the first medium. If the first medium ID is 1520, then the second storage array would search for the highest medium ID which is less than 1520 and then send this ID to the first storage array. This ID may be 1519, 1518, 1517, or whichever medium ID is below and closest to 1520 and is stored in a read-only state on the second storage array.

In a further embodiment, the first storage array may request for the second storage array to identify the youngest ancestor of the first medium which is stored on the second storage array. For example, if the first medium ID is 2260, and if there are four ancestors of the first medium stored on the second storage array which are medium IDs 2255, 2240, 2230, and 2225, then the second storage array may identify medium ID 2255 as the youngest ancestor of medium ID 2260. It may be assumed for the purposes of this discussion that all ancestors of the first medium are read-only. In a still further embodiment, the first storage array may request for the second storage array to identify the youngest medium stored on the second storage array. For example, in one scenario, the second storage array may only store snapshots from a single volume, and so in that scenario, the most recent snapshot stored on the second storage array will be the youngest ancestor of the first medium.

Next, in response to receiving the request for a list of ancestors of the first medium which are already stored on the second storage array, the second storage array may generate and send the list to the first storage array (block 2125). In one embodiment, the second storage array may be able to determine the ancestors of the first medium after receiving only the ID of the first medium. For example, the second storage array may already know which volume is associated with the first medium (e.g., if the second storage array generated the replication request for the first volume), and the second storage array may have received previous snapshots associated with the first volume. Therefore, the second storage array may identify all previous snapshots associated with the first volume as ancestors of the first medium. In another embodiment, the first storage array may send an ID of each ancestor of the first medium to the second storage array along with the request in block 2120. Alternatively, in a further embodiment, rather than requesting a list of ancestors, the first storage array may request a list of any read-only mediums stored on the second storage array which are older (i.e., have lower ID numbers) than the first medium. It is noted that block 2120 may be omitted in some embodiments, such that the second storage array may generate and send a list of first medium ancestors (or the other lists described above) to the first storage array automatically in response to receiving a request to replicate the first medium.

In response to receiving the list of ancestors of the first medium which are already stored on the second storage array, the first storage array may use the list to identify regions of the first medium which are not already stored on the second storage array (block 2130). Then, the first storage array may send only these regions of the first medium to the second storage array (block 2135). It is noted that in another embodiment, the above-described steps of method 2100 may be utilized for replicating the first volume from the first storage array to a cloud service rather than to the second storage array.

It is noted that in the above description, it is assumed that when a medium ID is generated for a new medium, the most recently generated medium ID is incremented by one to generate the new medium ID. For example, medium ID 2310 will be followed by 2311, 2312, and so on for new mediums which are created. Alternatively, the medium ID may be incremented by two (or other numbers), such that medium ID 2310 will be followed by 2312, 2314, and so on. However, it is noted that in other embodiments, medium IDs may be decremented when new mediums are created. For example, the first medium which is created may get the maximum possible ID, and then for subsequent mediums, the ID may be decremented. In these other embodiments, the above described techniques may be modified to account for this by recognizing that lower IDs represent younger mediums and higher IDs represent older mediums.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage system for replicating data to a cloud-based server, the system configured to:
    by a storage controller,
    take a first snapshot of a local dataset stored on one or more storage devices,
    take a second snapshot of the local dataset; wherein the second snapshot includes only changes made to the local dataset since the first snapshot was taken;
    deduplicate and compress the second snapshot; and
    send to the cloud-based server, the deduplicated and compressed second snapshot in a stream of data including first data that references second data within the stream, the stream further including third data that references previously replicated data already stored.

2. The storage system as recited in claim 1, wherein the cloud-based server is configured to apply the deduplicated and compressed data to a remote dataset.

3. The storage system as recited in claim 1, wherein the system is further configured to send an identifier (ID) to the cloud-based server, wherein the ID is associated with the second snapshot of the local dataset.

4. The storage system as recited in claim 1, wherein the system is further configured to encrypt the deduplicated and compressed second snapshot prior to sending the deduplicated and compressed second snapshot to the cloud-based server.

5. The storage system as recited in claim 1, wherein the cloud-based server is further configured to:
    select, from a plurality of systems, a second system for restoring the remote dataset responsive to an indication of failure of the local dataset; and
    send the stream to the second system for restoration.

6. A method comprising:
    performing, by a storage controller:
    taking a first snapshot of a local dataset stored on one or more storage devices,
    taking a second snapshot of the local dataset; wherein the second snapshot includes only changes made to the local dataset since the first snapshot was taken;
    deduplicating and compressing the second snapshot; and
    sending to the cloud-based server, the deduplicated and compressed second snapshot in a stream of data including first data that references second data within the stream, the stream further including third data that references previously replicated data already stored.

7. The method as recited in claim 6, further comprising applying the deduplicated and compressed data to a remote dataset at the cloud-based server.

8. The method as recited in claim 6, further comprising sending an identifier (ID) to the cloud-based server, wherein the ID is associated with the second snapshot of the local dataset.

9. The method as recited in claim 6, further comprising encrypting the deduplicated and compressed second snapshot prior to sending the deduplicated and compressed snapshot to the cloud-based server.

10. The method as recited in claim 6, further comprising:
    selecting, from a plurality of storage systems, a second storage system by the cloud-based server for restoring the remote dataset responsive to an indication of failure of the local dataset; and
    sending the stream to the second storage system from the cloud-based server for restoration.

11. A non-transitory computer readable storage medium storing program instructions, wherein the program instructions are executable by a processor to:
    by a storage controller:
    take a first snapshot of a local dataset stored on one or more storage devices,
    take a second snapshot of the local dataset; wherein the second snapshot includes only changes made to the local dataset since the first snapshot was taken;
    deduplicate and compress the second snapshot; and
    send to the cloud-based server, the deduplicated and compressed second snapshot in a stream of data including first data that references second data within the stream, the stream further including third data that references previously replicated data already stored.

12. The non-transitory computer readable storage medium as recited in claim 11, wherein the program instructions are further executable by a processor to apply the deduplicated and compressed data to a remote dataset at the cloud-based server.

13. The non-transitory computer readable storage medium as recited in claim 11, wherein the program instructions are further executable by a processor to send an identifier (ID) to the cloud-based server, wherein the ID is associated with the second snapshot of the local dataset.

14. The non-transitory computer readable storage medium as recited in claim 11, wherein the program instructions are further executable by a processor to:
    select, from a plurality of storage systems, a second storage system by the cloud-based server for restoring the remote dataset responsive to an indication of failure of the local dataset; and
    send the stream to the second storage system from the cloud-based server for restoration.

* * * * *